US012573069B2

(12) United States Patent
Valli et al.

(10) Patent No.: US 12,573,069 B2
(45) Date of Patent: Mar. 10, 2026

(54) SYSTEMS AND METHODS FOR GENERATING AND CODING MULTIPLE FOCAL PLANES FROM TEXTURE AND DEPTH

(71) Applicant: Adeia Guides Inc., San Jose, CA (US)

(72) Inventors: Seppo Valli, Espoo (FI); Pekka Siltanen, Helsinki (FI)

(73) Assignee: Adeia Guides Inc., San Jose, CA (US)

( * ) Notice: Subject to any disclaimer, the term of this patent is extended or adjusted under 35 U.S.C. 154(b) by 449 days.

(21) Appl. No.: 18/088,397

(22) Filed: Dec. 23, 2022

(65) Prior Publication Data

US 2024/0212185 A1      Jun. 27, 2024

(51) Int. Cl.
*G06K 9/00* (2022.01)
*G06T 7/529* (2017.01)
*G06T 7/593* (2017.01)

(52) U.S. Cl.
CPC .............. *G06T 7/593* (2017.01); *G06T 7/529* (2017.01)

(58) Field of Classification Search
CPC .... H04N 19/597; H04N 19/70; H04N 13/161; H04N 13/194; H04N 2013/0092; G06T 7/593; G06T 7/529
See application file for complete search history.

(56) References Cited

U.S. PATENT DOCUMENTS

2015/0215600 A1 * 7/2015 Norkin ................. H04N 13/128
348/43

2015/0269736 A1 * 9/2015 Hannuksela ......... H04N 13/395
345/419
2020/0294271 A1 * 9/2020 Ilola ........................ G06T 17/20
(Continued)

FOREIGN PATENT DOCUMENTS

| EP | 2922021 A1 | 9/2015 |
| WO | 2019183211 A1 | 9/2019 |
| WO | WO-2021240056 A1 * | 12/2021 |

OTHER PUBLICATIONS

PCT International Search Report and Written Opinion of the International Searching Authority, International Application No. PCT/US2023/085037, Apr. 19, 2024.

(Continued)

*Primary Examiner* — Gregory A Morse
*Assistant Examiner* — Owais Iqbal Memon
(74) *Attorney, Agent, or Firm* — HG Law LLP

(57) ABSTRACT

System and methods are provided for using multi-format representation and coding of visual information. The system accesses an image data that comprises a texture data and a depth map; decomposes the depth map into a plurality of component depth maps (CDMs); and generates multiple focal planes (MFPs) comprising a plurality of focal planes. Each respective focal plane is based on the texture data and a respective CDM of the plurality of CDMs. The system selects a data subset including one or more of: (a) the texture data, (b) the depth map, (c) the plurality of CDMs, or (d) the plurality of focal planes; generates encoded data based on the selected data subset; and transmits, over a communication network, the encoded data to a client device to cause the client device to: generate for display or for further processing an image based on the encoded data.

20 Claims, 19 Drawing Sheets

(56) References Cited

U.S. PATENT DOCUMENTS

2020/0302571 A1 * 9/2020 Schwarz .................. G06T 7/70

OTHER PUBLICATIONS

U.S. Appl. No. 17/984,994, filed Nov. 10, 2022.
U.S. Appl. No. 17/984,997, filed Nov. 10, 2022.
U.S. Appl. No. 18/088,206, filed Dec. 23, 2022.
U.S. Appl. No. 18/088,207, filed Dec. 23, 2022.
Akeley, Kurt , et al., "A Stereo Display Prototype with Multiple Focal Distances", Akeley, Kurt et al., "A Stereo Display Prototype with Multiple Focal Distances," ACM Trans. Graph. 23, 3, 804-816. (2004).
Chan, Yui-Lam , et al., "Overview of current development in depth map coding of 3D video and its future", Chan, Yui-Lam et al., "Overview of current development in depth map coding of 3D video and its future," IET Signal Process., 14: 1-14. https://doi.org/10.1049/iet-spr.2019.0063. (2020).

* cited by examiner

| Comments | Texture – depth continuum | | | |
|---|---|---|---|---|
| | Only texture | Texture and depth | Only Depth | |
| Basic formats | Texture (default) | | Depth Map | |
| Decomposition of a depth map | | | CDM | |
| Focal planes of a texture | | MFP | | |
| Focal planes of a depth map | | | | CDMFP |

Processing advances to this direction →

$$W_i(x,a_i,b_i,c_i) = \begin{cases} (x - a_i)/(b_i - a_i), & a_i \le x < b_i \\ (c_i - x)/(c_i - b_i), & b_i \le x < c_i \\ 0, & x <= a_i \text{ or } x >= c_i \end{cases}$$

308

$d(x,y) = c_{j1} - (c_{j1}-b_{j1})*w_{j1}(x,y)$, where $j1$ = smallest i where $w_i(x,y) > 0$ $d(x,y) = a_{j2} + (b_{j2}-a_{j2})*w_{j2}(x,y)$, where $j2$ = largest i where $w_i(x,y) > 0$

Figure 6:
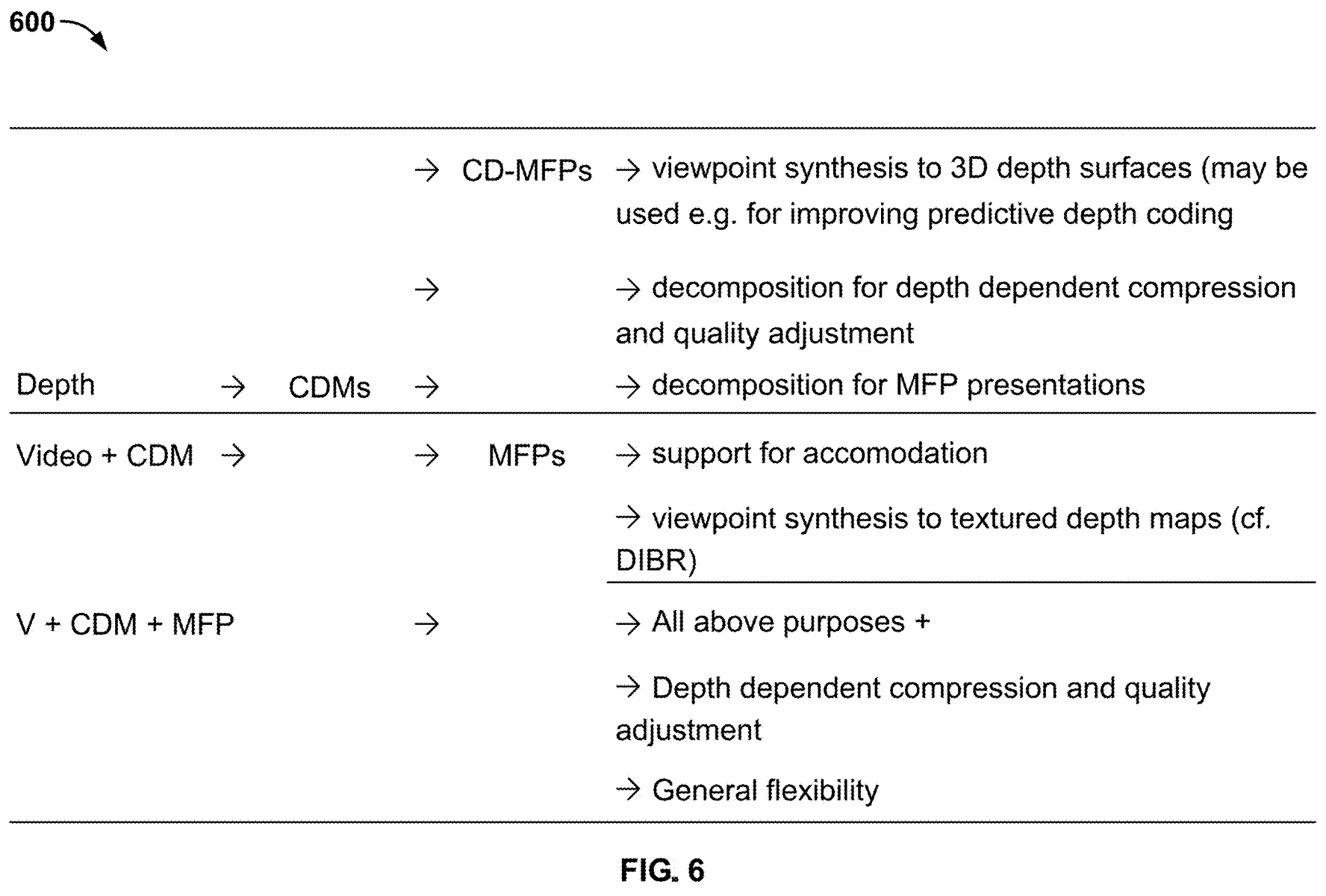

600

Depth → CDMs → CD-MFPs → viewpoint synthesis to 3D depth surfaces (may be used e.g. for improving predictive depth coding → decomposition for depth dependent compression and quality adjustment → decomposition for MFP presentations Video + CDM → MFPs → support for accomodation → viewpoint synthesis to textured depth maps (cf. DIBR)

V + CDM + MFP → All above purposes +

→ Depth dependent compression and quality adjustment

→ General flexibility

| | T(x,y) | D(x,y) | |
|---|---|---|---|
| | $C_1(x,y) = B_1(D(x,y))$ | $C_2(x,y) = B_2(D(x,y))$ | $C_3(x,y) = B_3(D(x,y))$ | $\sum_i C_i(x,y) = 255$ (or fully saturated in general) |
| | $M_1(x,y) = T(x,y) * C_1(x,y)$ | $M_2(x,y) = T(x,y) * C_2(x,y)$ | $M_3(x,y) = T(x,y) * C_3(x,y)$ | $\sum_i M_i(x,y) = T(x,y)$ |

FIG. 11

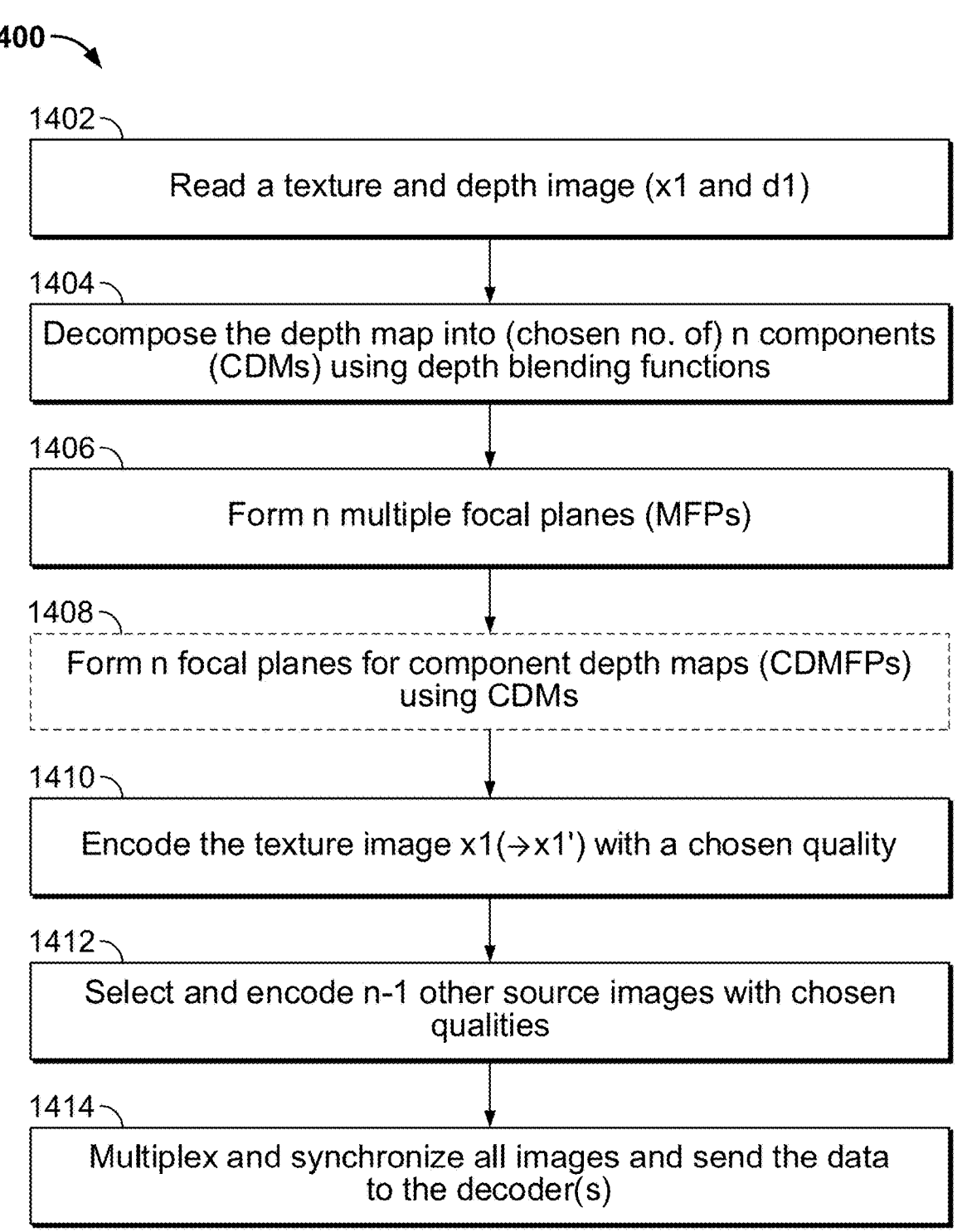

1400

1402
Read a texture and depth image (x1 and d1)

1404
Decompose the depth map into (chosen no. of) n components (CDMs) using depth blending functions 1406
Form n multiple focal planes (MFPs)

1408
Form n focal planes for component depth maps (CDMFPs) using CDMs

1410
Encode the texture image x1($\rightarrow$x1') with a chosen quality

1412
Select and encode n-1 other source images with chosen qualities

1414
Multiplex and synchronize all images and send the data to the decoder(s)

FIG. 14

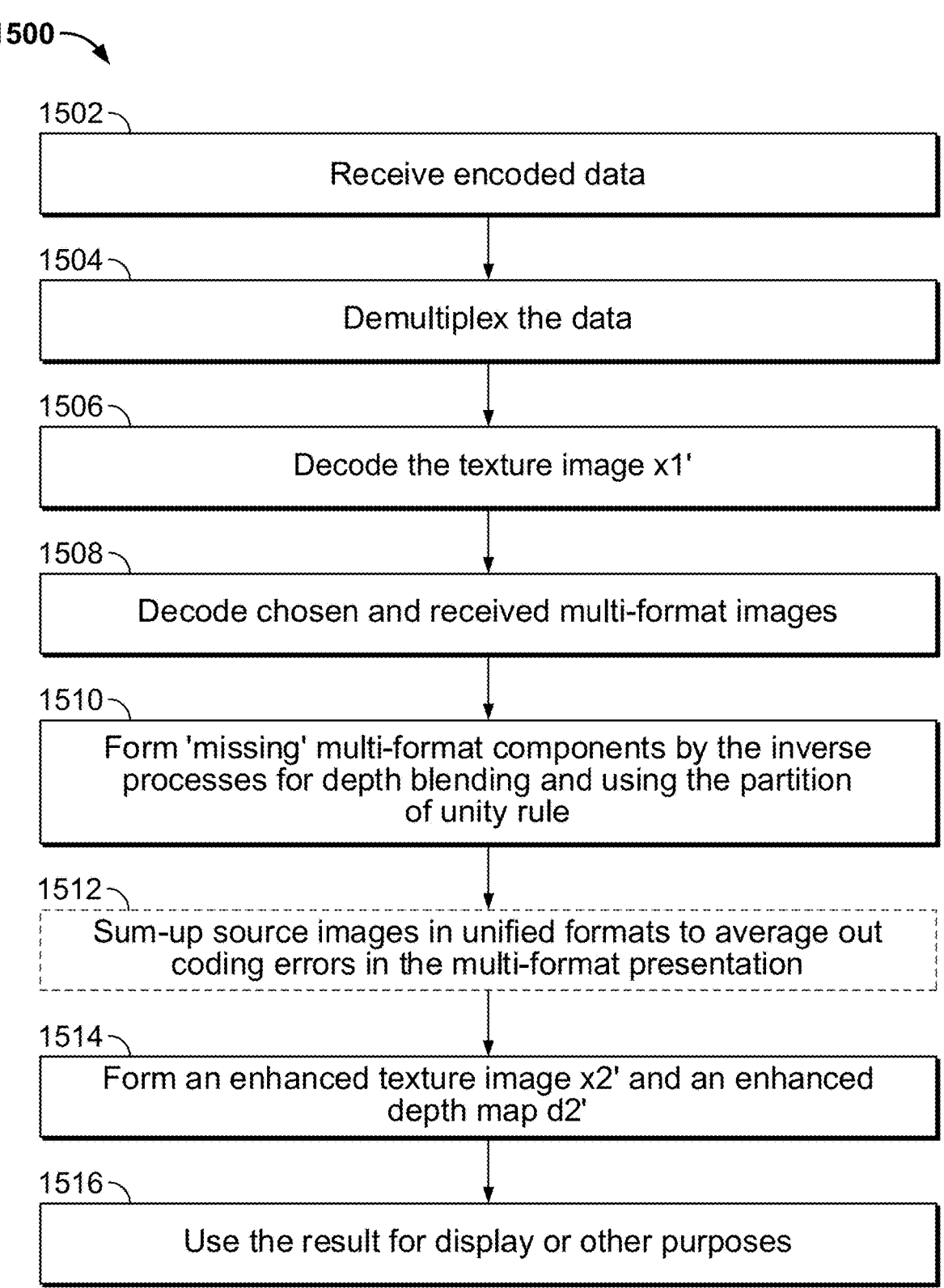

1500 ⌐

1502 ⌐
Receive encoded data

1504 ⌐
Demultiplex the data

1506 ⌐
Decode the texture image x1'

1508 ⌐
Decode chosen and received multi-format images

1510 ⌐
Form 'missing' multi-format components by the inverse processes for depth blending and using the partition of unity rule 1512 ⌐
Sum-up source images in unified formats to average out coding errors in the multi-format presentation 1514 ⌐
Form an enhanced texture image x2' and an enhanced depth map d2'

1516 ⌐
Use the result for display or other purposes

FIG. 15

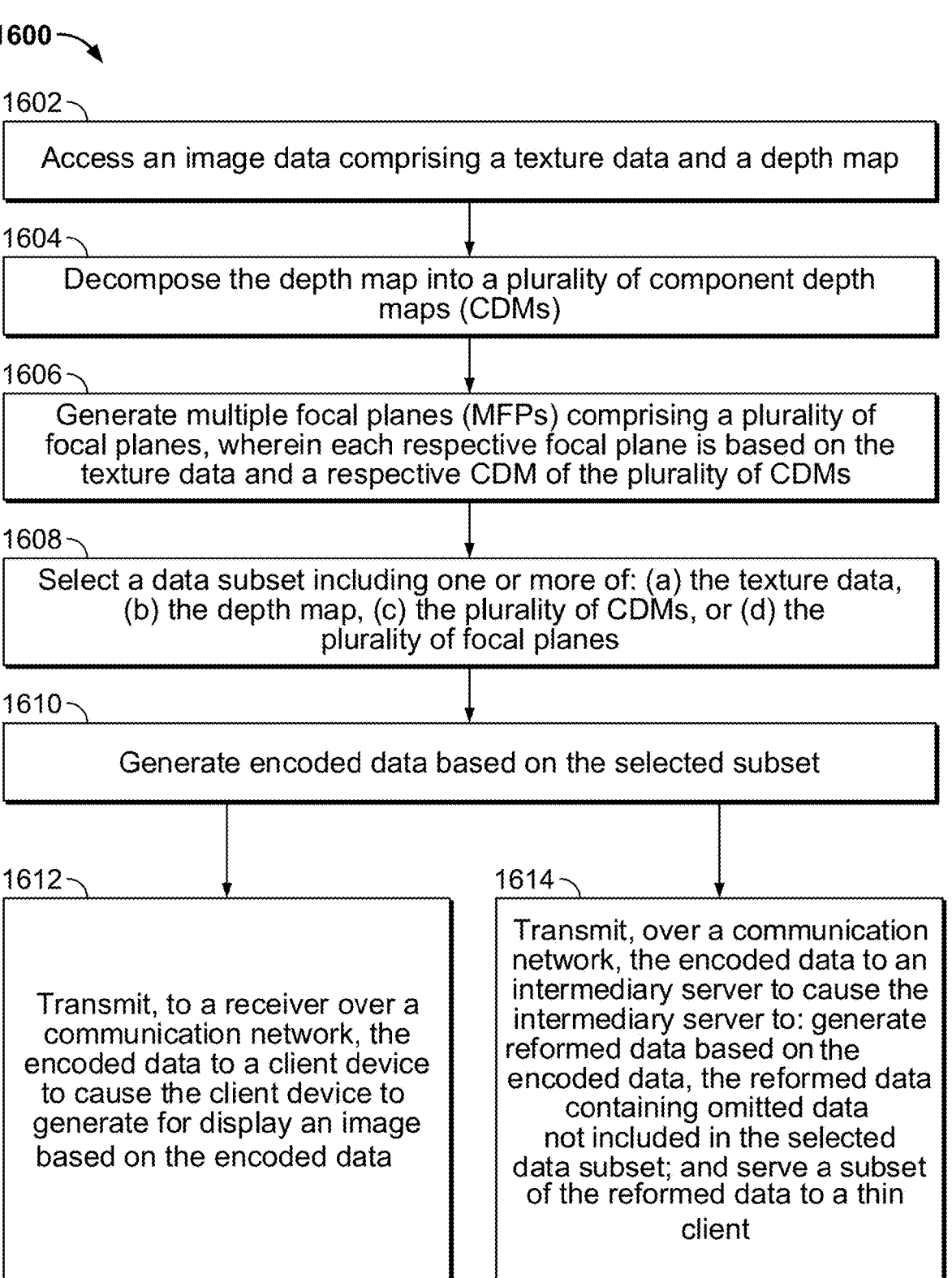

1600 ⤸

1602 ⌐

Access an image data comprising a texture data and a depth map

1604 ⌐

Decompose the depth map into a plurality of component depth maps (CDMs)

1606 ⌐

Generate multiple focal planes (MFPs) comprising a plurality of focal planes, wherein each respective focal plane is based on the texture data and a respective CDM of the plurality of CDMs

1608 ⌐

Select a data subset including one or more of: (a) the texture data, (b) the depth map, (c) the plurality of CDMs, or (d) the plurality of focal planes

1610 ⌐

Generate encoded data based on the selected subset

1612 ⌐

Transmit, to a receiver over a communication network, the encoded data to a client device to cause the client device to generate for display an image based on the encoded data

1614 ⌐

Transmit, over a communication network, the encoded data to an intermediary server to cause the intermediary server to: generate reformed data based on the encoded data, the reformed data containing omitted data not included in the selected data subset; and serve a subset of the reformed data to a thin client

FIG. 16

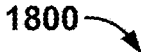

1800

1802

Decode the encoded data to generate (a) decoded texture data and (b) n -1 decoded selected CDMs and decoded selected focal planes, wherein the plurality of CDMs is a set of n CDMs , the plurality of focal planes is a set of n focal planes and each respective focal plane of the plurality of focal planes corresponds to a respective depth range of the depth map

1804

Generate n reformed CDMs and n reformed focal planes from the decoded texture data and the n-1 decoded selected CDMs and decoded selected focal planes, wherein the n reformed CDMs and n reformed focal planes contain omitted CDMs and omitted focal planes that were not included in the selected data subset

FIG. 18

SYSTEMS AND METHODS FOR GENERATING AND CODING MULTIPLE FOCAL PLANES FROM TEXTURE AND DEPTH

BACKGROUND

This disclosure is generally directed to techniques for encoding video frames.

SUMMARY

A video plus depth (V+D) format (also referred to as texture and depth format) may be used for content capture and delivery and for supporting various stereoscopic 3D (S3D) and 3D applications. The V+D format may be used in multiple focal plane (MFP) display solutions to support natural eye focus/accommodation. However, the V+D format has various limitations which may hinder its use in 3D video coding and streaming. The format may have various limitations in particular w.r.t the dynamics and quality of the depth signal. For example, coding and transmitting high dynamic data from modern depth sensors may need improvements. Further, in current and future 3D applications, supporting arbitrary viewpoints may require better solutions for depth (distance) based quality adjustment.

When using V+D format, allocating bits between video and depth components may considerably affect the coding quality. An optimal format for coding quality may depend on the content and purpose of the use of the data. Thus, it may be desirable for a format to have more flexibility and precision to allocating bits.

In one approach, the average differences (e.g. mean squared error (MSE)) of original and coded pixel values may be used to make choices for coding quality. This distortion measure may work well for coding video (i.e. texture) sequences. However, it may not work well for coding depth signals (sequences of depth maps) due to different properties of video and depth signals. Thus, it may be desirable to not directly use video coding methods for coding depth data.

In one approach, video coding may be developed and used for viewing TV type of content, i.e., to be seen from a fixed viewpoint (e.g., without having a natural 3D viewpoint). In such cases, (e.g., similar for the human eye), the accuracy of the captured content may be inversely proportional to the square of the viewing distance. Further, in such use, knowledge on the pixel (voxel) distances (i.e. depth information) may not be needed. For example, stereoscopic (S3D) perception may be supported without depth data by capturing two views with a small disparity. However, this approach may have problems when content quality depends on a viewer's viewpoint and distance from the content (renderings). For example, problems may happen when a video plus depth signal is used for 3D reconstruction, and a user views content from varying viewpoints either by the user moving physically or by moving the content as a 3D model on a computer screen. In such cases, the content may be expected to be seen with a same or similar quality from any viewpoint and the accuracy cannot follow the inverse square of the viewing distance.

The requirements for content accuracy and resolution may be heavily dependent on a user's interactions and viewpoints to a rendering. Thus, it may be desirable that future compression coding methods provide better flexibility to support distance or depth dependent coding.

The present disclosure helps to address the problems described above, by, for example, providing systems and methods that improve and extend a V+D format by using distance (depth blending) based decompositions to produce additional content components.

The V+D format supports two different content types, i.e. image texture and depth information. The V and D formats may represent opposite ends of a texture-depth continuum, texture image being a depth-agnostic format, and depth being correspondingly a texture-agnostic component. However, the disclosed approach may use intermediate formats between these two, which may bring various benefits to 3D applications. The disclosed approach may extend the V+D format by a set of formats that may contain fine-grained mixtures of texture and depth information. The set of formats may be formed using a depth blending approach for a chosen number of depth ranges. The images generated in the set of formats (additional content components) may be referred to as multiple-format images. Source images may refer to images that may be chosen as representative images. For example, the images of the V+D format (e.g., texture image and depth map) may be referred to as source images (e.g., original source images). In some embodiments, texture data is selected as a default component (representative image) and the additional content components along with texture data may be referred to as source images. In addition to texture and depth map images, the set of multiple-format images may include component depth map images (CDMs), multiple focal planes (MFPs), and component depth map focal planes (CDMFPs).

In some embodiments, in addition to a texture image, one of several other source images may be chosen as a representative image for a depth range. In some embodiments, CDMFP images are not chosen as a representative image. By not choosing from CDMFP images, only all but one depth range (e.g., out of n depth ranges, only n−1 depth ranges) may need to be represented to reconstruct the original texture plus depth images from the representative images. An image for the one unrepresented range may be reconstructed indirectly, based on the relations of the decomposed images and the complementary properties of depth blending functions (e.g., partition of unity).

In some embodiments, a texture image is chosen as a default for delivery (e.g., transmission with other selected source images). The default texture image may enable the use of partition of unity property to recover the MFP for an unrepresented depth range. The depth map may not be transmitted by default, and a similar recovery may not be possible for a missing CDMFP image. Correspondingly, the whole format of CDMFPs may be discarded from being used as representative images.

The flexibility of choosing representative images may enable emphasizing desired properties of each input (V+D) image on the texture-depth continuum. The disclosed approach may enable a choice of a representative image for each depth range, free allocation of bits between the representatives, and which coding approach is used for each of the representatives. For example, depth signal properties may differ greatly at different distances from a depth sensor. In a receiver, any or all decomposed images may be formed from the decoded representatives, which may support a flexible variety of use cases for the output. In some embodiments, the receiver is a server that may support thin clients.

In some embodiments, a system (e.g., using a codec application) accesses image data that comprises texture data and a depth map. The system may decompose the depth map into a plurality of component depth maps (CDMs). The system may generate multiple focal planes (MFPs) comprising a plurality of focal planes. Each respective focal plane may be based on the texture data and a respective CDM of the plurality of CDMs.

In some embodiments, the system selects a data subset including one or more of: (a) the texture data, (b) the depth map, (c) the plurality of CDMs, or (d) the plurality of focal planes. For example, the plurality of CDMs may be a set of n CDMs, and the data subset may comprise (a) the texture data and (b) n−1 selected CDMs. As another example, the plurality of focal planes may be a set of n focal planes, and the data subset may comprise (a) the texture data and (b) n−1 selected focal planes. In one example, the data subset may comprise (a) the depth map and (b) the plurality of focal planes. As another example, the data subset may comprise (a) the plurality of CDMs and (b) the plurality of focal planes.

In some embodiments, the plurality of CDMs is a set of n CDMs, and the plurality of focal planes is a set of n focal planes. Each respective CDM of the plurality of CDMs and each respective focal plane of the plurality of focal planes may correspond to a respective depth range of the depth map. In some embodiments, the data subset comprises (a) the texture data and (b) n−1 selected CDMs and selected focal planes, and each one of the selected CDMs and the selected focal planes may correspond to a different depth range of the depth map. In some embodiments, the data subset comprises (a) the texture data and (b) n selected CDMs and selected focal planes, and each one of the selected CDMs and the selected focal planes may correspond to a different depth range of the depth map.

In some embodiments, the system generates encoded data based on the selected data subset. The system may transmit, over a communication network, the encoded data to a client device to cause the client device to generate for display an image based on the encoded data.

In some embodiments, the system decodes the encoded data to generate (a) decoded texture data and (b) n−1 decoded selected CDMs and decoded selected focal planes. The system may generate n reformed CDMs and n reformed focal planes from the decoded texture data and the n−1 decoded selected CDMs and decoded selected focal planes. The n reformed CDMs and n reformed focal planes may contain omitted CDMs and omitted focal planes that were not included in the selected data subset. In some embodiments, the system generates a reformed depth map by inverse depth blending the n reformed CDMs.

In some embodiments, the system generates a reformed CDM of the n reformed CDMs by: summing n−1 reformed CDMs of the n reformed CDMs to generate a partial CDM sum; and subtracting the partial CDM sum from a saturated matrix to generate the reformed CDM. A saturated matrix may be a fully saturated image (e.g., saturated image, each pixel is a maximum value of the pixel). For example, in an 8-bit image, each pixel may have 256 possible numerical values from 0-255, and in a saturated matrix or a fully saturated image of an 8-bit image, each pixel value may be the maximum value of 255.

In some embodiments, the system generates a reformed focal plane of the plurality of focal planes by: summing n−1 reformed focal planes of the n reformed focal planes to generate a partial MFP sum; and subtracting the partial MFP sum from the decoded texture data to generate the reformed focal plane.

In some embodiments, the system generates, from a decoded CDM of the n reformed CDMs, a corresponding reformed focal plane of the n reformed MFPs by: multiplying the decoded texture data by the decoded CDM to generate the corresponding reformed focal plane of the n reformed focal planes.

In some embodiments, the system transmits, over a communication network, the encoded data to an intermediary server to cause the intermediary server to: generate reformed data based on the encoded data, the reformed data containing omitted data not included in the selected data subset; and serve a subset of the reformed data to a thin client.

The disclosed multi-format approach may enable assigning bits and quality to desired features of the content to be coded. In addition to texture or depth based features, the variety of multi-format options may enable emphasizing/ weighting features along more fine-grained texture-depth continuum. In effect, choosing an intermediate image format for coding may mean modifying an error measure from conventional error measures (e.g. SNR or PSNR). This may be effective for use in applications with changing user positions and viewpoints.

As a result of the use of these techniques, 3D media content may be efficiently encoded for storage and/or for transmission.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 1B shows an example table of hierarchy/relations of content formats on a texture-depth continuum, in accordance with some embodiments of this disclosure;

FIG. 6 shows a summary of the decompositions by depth blending with examples of their use, in accordance with some embodiments of this disclosure;

FIG. 11 shows an illustrated proof for generating all component images texture data and n−1 representative images in an n-component multi-format presentation, in accordance with some embodiments of this disclosure;

FIG. 14 is a flowchart of a detailed illustrative process for multi-format processing including texture data for the transmitter, in accordance with some embodiments of this disclosure;

FIG. 15 is a flowchart of a detailed illustrative process for multi-format processing including texture data for the receiver, in accordance with some embodiments of this disclosure;

FIG. 16 is a flowchart of a detailed illustrative process for using a multi-format representation for coding and transmission for the transmitter, in accordance with some embodiments of this disclosure;

FIG. 18 is a flowchart of a detailed illustrative process for using a multi-format representation for decoding video and texture data, in accordance with some embodiments of this disclosure.

DETAILED DESCRIPTION

A video plus depth content format may be a versatile format for various S3D applications. The disclosed multi-format approach may improve and extend this format further by using distance (depth blending) based decompositions to produce additional content components. A small subset of multi-format components may enable adjusting quality on desired properties in the encoder and may be adequate to reconstruct a whole set of formats in the receiver. The disclosed approach may provide quality improvements and improve flexibility for various existing and future 3D applications.

A sequence of texture and depth map images, i.e. video plus depth (V+D) format may be a simple and versatile format for various multimedia applications. In addition to stereoscopic (S3D) renderings it may support even accommodation (natural eye focus) when decomposed into multiple focal planes (MFPs). The V+D format may support synthesizing of 3D viewpoints e.g. when producing stereoscopic (cf. depth image based rendering, DIBR) and motion parallax effects. Further, using various reconstruction algorithms (Simultaneous Localization and Mapping (SLAM), Truncated Signed Distance Function (TSDF), etc.), video plus depth streams may be used to produce 3D reconstructions of physical spaces.

However, in emerging 3DoF, 3DoF+ and 6DoF applications, a user may make more arbitrary and large viewpoint changes, which may challenge the possibilities of being served by the video plus depth format. Viewpoints may namely change to such orientations, that the quality of more far away objects and surfaces may not be enough. This type of need may depend largely on the use case and content and may require better flexibility than what the basic video plus depth format can provide. In particular, possibilities to adjust content quality depending on a camera's and viewer's varying distances to a scene may need to be improved.

Video plus depth (V+D) may be a common format for content capture and delivery. However, the format may have various limitations which may hinder its use in more advanced 3D applications. In particular, these limitations may relate the maximum supported dynamics and accuracy for the depth signal, and the possibilities for allocating bits (quality) depending on the distances of captured data. The disclosed approach may support a larger set of content formats. The formats may enable emphasizing/optimizing content properties in a more fine-grained way between the texture (depth agnostic) and depth map (texture agnostic) extremes.

The disclosed approach may use formats formed and supported by depth blending. For example, depth blending may enable conversions between different formats and the formation of various output formats in a receiver. Depth blending may be an approach to produce depth-based decompositions using video plus depth (texture and depth map) images. These images may form a continuum between the texture and depth map representation.

Figure 1A:
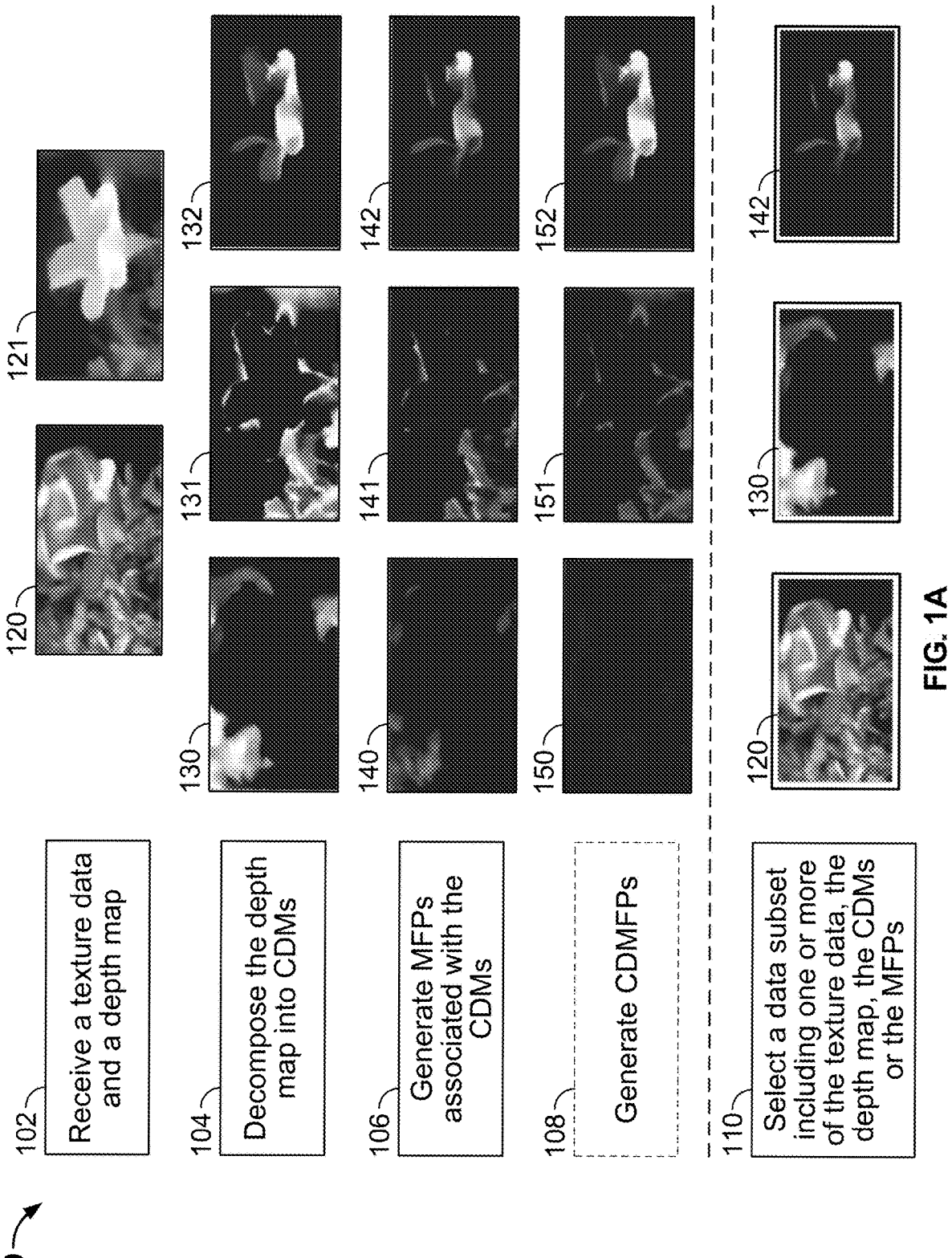
FIG. 1A shows an example of generating additional content components from texture image and a depth map using depth blending and selecting a subset of data for a multi-format representation of the texture image and the depth map, in accordance with some embodiments of this disclosure.

FIG. 1A shows an example of generating additional content components from texture image and a depth map using depth blending and selecting a subset of data for a multi-format representation of the texture image and the depth map, in accordance with some embodiments of this disclosure.

In some embodiments, a system receives, at step 102, a texture data and a depth map. For example, a system may receive as an input (or access) an image in texture and depth (or V+D) format, such as example texture data 120 and a depth map 121 shown in FIG. 1A. For example, image data may comprise a frame of a video (e.g., 3D video) or other media content (e.g., 3D video game, 3D video conference, etc.). In another example, image data may be received from a camera or a sensor. In some embodiments, image data may include a texture of an image and depth data (depth map) for the image data. For example, the texture data may be a table comprising luminance and/or color (e.g., YCbCr, RGB, or any suitable color format) matrix, where each cell in the matrix represents brightness and color of a single pixel. The depth data may be a matrix (of the same size as the texture matrix) that defines depth for each of the pixels in the texture matrix. While V+D may be a common format for content capture and delivery, this format may have limitations for use in advanced 3D applications. In steps 104 to 108, the system may generate a set of additional content components (also referred to as source images and multi-format images) which may be used to support a more flexible coding and processing of content. FIG. 1A shows examples of decompositions formed using depth blending. The decomposed images may be the result of a multiple focal plane (MFP) formation process by depth blending. For example, MFPs may be formed by traditional linear depth blending (e.g., as described in Akeley, Kurt, et al. "A stereo display prototype with multiple focal distances." ACM transactions on graphics (TOG) 23.3 (2004): 804-813, which is herein incorporated by reference in its entirety). The decomposed images in FIG. 1A include component depth maps (CDMs), multiple focal planes (MFPs), and component depth map focal planes (CDMFPs).

The system may decompose, at step 104, the depth map into component depth maps (CDMs). For example, the system may decompose the depth map 121 into three component depth maps a first CDM 130, a second CDM 131, and a third CDM 132. In this example, the depth map 121 is decomposed into three CDMs, but the depth map may be decomposed to any suitable number of CDMs (e.g., 3, 4, 5, etc. CDMs). For example, the system may decompose a depth map into n CDMs, where n is an integer greater than 1. The system may decompose the depth map into component depth maps by using a depth blending approach. For example, the system may apply linear (tent) blending functions to the depth map 121 to generate CDMs. In some embodiments, CDMs are referred to as weight planes.

In the example shown in FIG. 1A, the depth map 121 may be a depth matrix $d(x,y)$. For example, the three CDMs 130, 131, and 132 may be three matrices $d_i(x,y)$ (where $d_1(x,y)$ is a first CDM for a first depth range, $d_2(x,y)$ is a second CMD for second depth range, etc.). The CDM may have been generated by mapping (replacing) each pixel depth $d(x,y)$ by a depth dependent value $w_i(d)$, where e.g., $i=1 \ldots 3$. Similar technique may be used for any number of CDMs for any number of depth ranges, e.g., value of i may vary between 1 and 5, 1 and 10, 1 and 20, etc.

In some embodiments, depth blending is forming depth-range-dependent image components (planes) by weighting (blending) pixels in neighboring depth ranges. Blending may create a stack of image planes with smooth transitions and partial overlap between their contents. Depth blending may be used to form multiple focal planes (MFPs), which can be used to support natural eye-focus/accommodation by rendering the MFPs optically into a viewer's viewing frustum, at distances that the planes are formed to represent.

MFPs or other depth blending based decompositions may be formed at regular, dioptric or even arbitrary distances. In the example of FIG. 1A, and other examples in this disclosure, MFPs or other depth blending based decompositions (additional content components) may be given with fixed separations (e.g., separated at regular distances); however, the MFPs or additional content components may be formed at any suitable separation (e.g., regular, irregular, etc.) from each other. Details regarding depth blending can be found in descriptions of FIG. 2.

A property of the decompositions formed by depth blending may be their reciprocity, i.e., that an original source image can be reconstructed back from its decompositions (component images). In some embodiments, operations for completing a hierarchy of decomposed multiformat images using a chosen set of representative images are 1) depth blending, 2) inverse depth blending, and 3) partition of unity. Partition of unity may be implied by depth blending, and may be based on functions fulfilling this specific property. Details regarding depth blending using linear blending functions and inverse depth blending can be found in descriptions for FIGS. 3A-3D.

The system may generate, at step 106, multiple focal planes (MFPs) associated with the CDMs. MFPs may be a mixture of texture and depth information at specified depth ranges. For example, the system may multiply (e.g., by pixelwise multiplication) the texture data 120 with a respective CDM 130, 131, and 132, to generate a respective MFP 140, 141, and 142. The system may multiply texture data 120 with a first CDM 130 to generate a first MFP 140. The system may multiply texture data 120 with a second CDM 131 to generate a second MFP 141. The system may multiply texture data 120 with a third CDM 132 to generate a third MFP 142. In some embodiments, the system generates n CDMs from a depth map, and the system generates n corresponding MFPs for each respective CDM.

The system may generate, at step 108, multiple focal planes (MFPs) associated with the CDMs, referred to as component depth map MFPs (CDMFPs). For example, the system may multiply (e.g., by pixelwise multiplication) the depth map 121 with a respective CDM 130, 131, and 132, to generate a respective CDMFP 150, 151, and 152. The system may multiply the depth map 121 with a first CDM 130 to generate a first CDMFP 150. The system may multiply depth map 121 with a second CDM 131 to generate a second CDMFP 151. The system may multiply depth map 121 with a third CDM 132 to generate a third CDMFP 152. In some embodiments, step 108 of generating the CDMFPs is an optional step.

The system may select, at step 110, a data subset including one or more of the texture data, the depth map, the CDMs, or the MFPs. For example, the system may select texture image 120, CDM 130, and MFP 142 to represent the input image comprising the texture data 120 and the depth map 102. In some embodiments, the system may have texture data 120 as a default and select the CDM 130 and MFP 142 from the additional content components (source images) as representative images. In some embodiments, the system selects a small subset of multi-format components. The selection of a small subset of multi-format components may enable adjusting quality on desired properties in the encoder and may be adequate to reconstruct a whole set of formats in the receiver.

FIG. 1B shows an example table of hierarchy/relations of content formats on a texture-depth continuum, in accordance with some embodiments of this disclosure. The example table 175 shows the relationship of content formats and their positioning on a texture-and-depth continuum. The first column indicates that processing advances in a downward direction, the middle columns represent the texture-depth continuum, and the last column provides comments. In the second row, the texture-depth continuum is represented by labels "Only Texture," "Texture and Depth," and "Only Depth." As indicated by the comments, the third row shows examples of basic formats of "Only Texture" and "Only Depth." For example, "Texture" or texture data may be a format that represents only texture in the texture-depth continuum, and a "Depth Map" may be a format that represents only depth in the texture-depth continuum. Advancing downwards to the fourth row, an initial process step may be decomposition of a depth map, which may generate CDMs, and "CDM" is a format that represents only depth in the texture-depth continuum. Advancing to the fifth row, and as indicated by the comments a next process step may be generating focal planes of a texture data. For example, "CDM" and "Texture" may generate the focal planes, and "MFP" is a format that represents texture and depth in the texture-depth continuum.

An example selection of three multi-format representations may be "Texture", "CDM" and "MFP," as shown in the shaded cells of the table. In some embodiments, texture may be a default representative format.

Conversions between formats may be made using depth blending as indicated by the arrows in the table. For example, a depth map may be used to form CDMs. A texture and CDM formats may be used to form MFP formats. A CDM format may be used for form CDMFP format. For example, a CDM format may be used to reconstruct a depth map format, and a depth map format may be multiplied (e.g., pixelwise multiplication) by the CDM format to generate a CDMFP format. In another example, although not shown for simplicity in FIG. 1B, a depth map format may be multiplied by CDM format to generate CDMFPs.

In addition to video and depth signals, a set of formats supporting flexible distance specific coding and processing may be those obtained using a depth blending approach. For increasing flexible content generation, coding, and usage, use of a depth map or a sequence of depth maps may be replaced by using CDMs, which may be replaced with MFPs, formed using CDMs. MFPs may be a mixture of texture and depth information at specified ranges. The result may be a set of source images, from which a smaller subset may be coded and transmitted. In some embodiments, the system optimizes coding and usage of the content by selecting a subset based on desired depth properties and quality. In some embodiments, the system flexibly varies the content representation based on the viewpoints of the camera and a viewer, and their distances from the view or rendering.

For example, by using CDMs and MFPs instead of a depth map, a system can support flexibility in adjusting (depth dependent) quality and to enable multiple output formats. Both depth-dependent components may be formed from a texture and depth map image pair using depth blending. By omitting the depth map format, the resulting multi-format presentation may not unduly increase redundancy over the V+D format.

Texture (i.e. color) information may be needed for every pixel (voxel) of a view. Therefore, texture may be selected as a default data component, and may be coded and transmitted in any compilation of multi-format images. In some embodiments, where depth map is not selected as a default data component, CDMFPs may not be used for representative images. Note that a depth map may enable one depth range without explicit data (by exploiting the partition of unity property). CDMFPs may be formed in the receiver based on the supported multi-format options.

Any one component from each depth range may carry information both for texture and depth (cf. MFP) or just for the depth (cf. CDM). The granularity for the components can be adjusted by the number of depth blending functions (depth ranges) over the whole span of distances. Thus, in case e.g. more fine-grained depth-dependent adjustment for quality is desired, or e.g. more accuracy in accommodative rendering by MFPs in the receiver, the number of depth ranges may be increased. Correspondingly, the total number of content components and their combinations may be increased (i.e., options for source images for a multi-format representation).

In the multi-format decomposition into three depth ranges shown in FIG. 1A, there may be a total of seven source images (a texture image 120 plus six options for multi-format components three CDMs 130, 131, 132 and three MFPs 140, 141, 142). More examples and a general rule can be found below for the number of representative images as the function of the depth ranges produced by depth blending (c.f., columns in decompositions).

In some embodiments, increasing the number of depth ranges may increase the number of components to be reconstructed in the receiver. Although operations for the reconstruction may be straightforward per-pixel operations, the increase in reconstruction of components may be a drawback for thin clients. In some embodiments, a server performs reconstructions and desired formats may be transmitted from the server to thin clients. Details regarding an embodiment with a server can be found in the description of FIG. 10.

Figure 2:
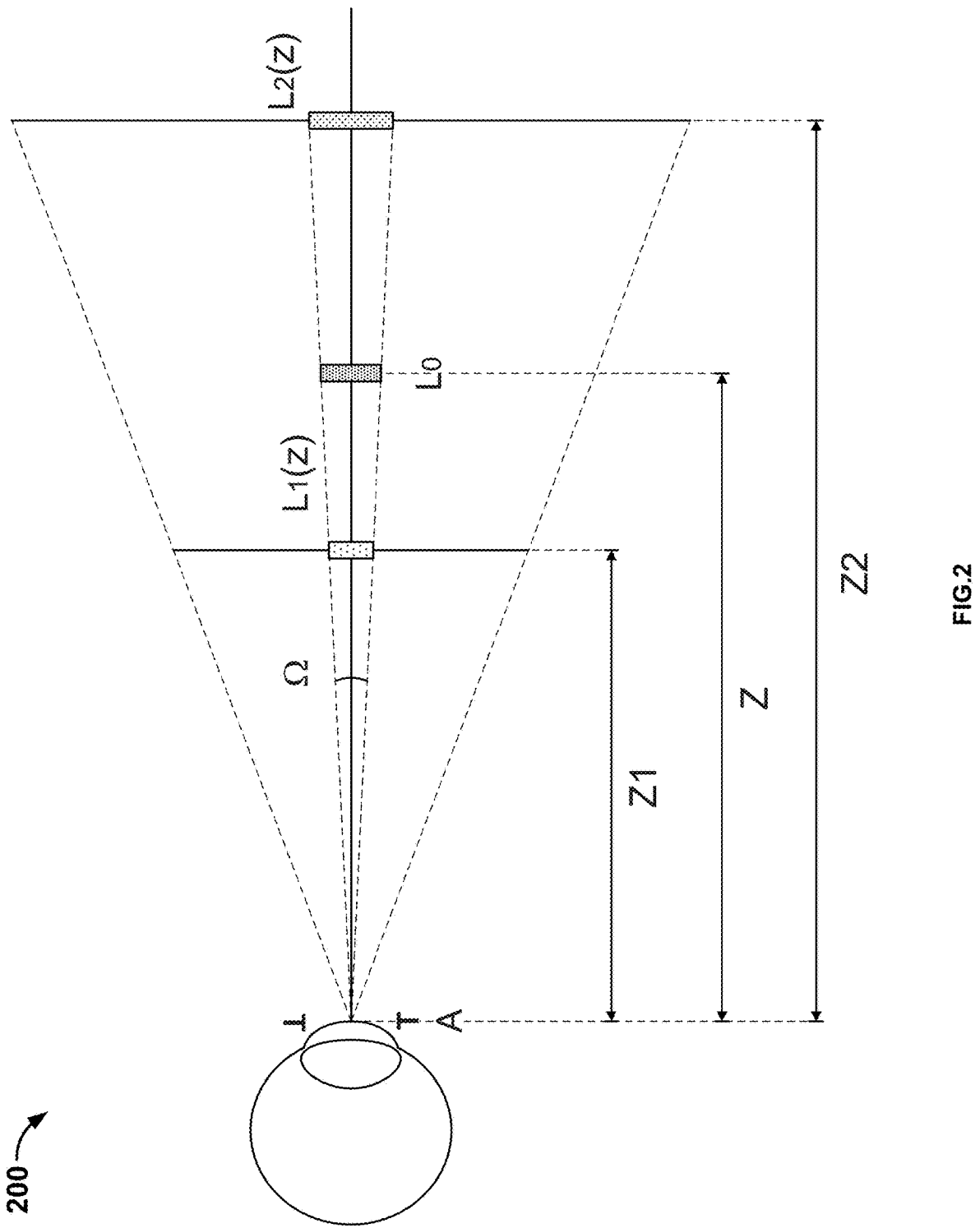
FIG. 2 depicts an example of depth blending techniques, in accordance with some embodiments of this disclosure.

FIG. 2 depicts an example of depth blending techniques, in accordance with some embodiments of this disclosure.

For example, in a case where there are only two planes ($L_1$ and $L_2$) that generate blended voxels, the depth blending 200 between the two focal planes may be determined according to the following equation:

$$L_0 = L_1(z) + L_2(z) = w_1(z)L_0 + w_2(z)L_0$$

where $w_1$ and $w_2$ are depth-weighted fusing functions. The perceived depth z of the fused voxel may be considered as a function of the depth-weighted fusing functions: $z = f(w_1, w_2)$, where a simple approximation function may be the weighted sum of the depths of the two focal planes: $z = w_1(z)z_1 + w_2(z)z_2$. The meaning of symbols of the equation above are demonstrated by FIG. 1B. In particular, A refers to aperture of the eye, $L_1$ and $L_2$ refer to blended luminance values on focal planes at distances $z_1$ and $z_2$, $L_0$ refers to the luminance value of the voxel to be blended at distance z. The symbol $\Omega$ refers to view angle from the eye through distances $z_1$ and $z_2$.

Figures 3A, 3B, 3C, 3D:
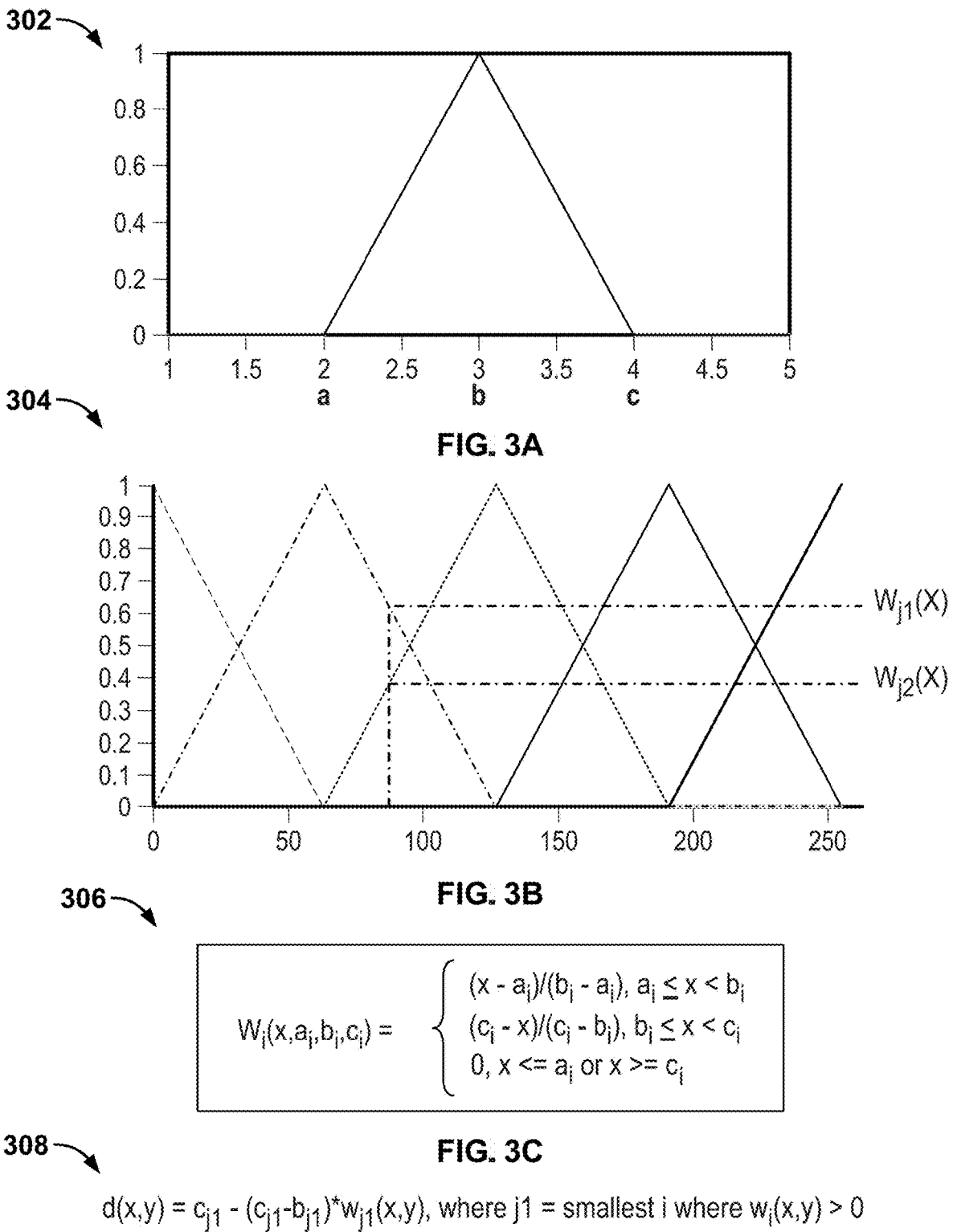
FIG. 3A depicts an example of depth blending techniques, in accordance with some embodiments of this disclosure.
FIG. 3B depicts another example of depth blending techniques, in accordance with some embodiments of this disclosure.
FIG. 3C depicts yet another example of depth blending techniques, in accordance with some embodiments of this disclosure.
FIG. 3D depicts an example of reversing depth blending, in accordance with some embodiments of this disclosure.

FIGS. 3A-C depict an example of depth blending techniques, in accordance with some embodiments of this disclosure. In particular, FIGS. 3A-C illustrate an example function that may be used to generate CDMs by decomposition block 712, 812 of FIG. 7, FIG. 8, respectively.

FIG. 3A shows a graph 302 of an example tent function. The "tent" is defined by a first line that intersects the x-axis at point a and a second line that that intersects the x-axis at point c. The lines further intersect at point b along the x axis. As shown, the x-axis corresponds to possible depth values. While depth values between 0 and 255 are shown for 8-bit matrices, any other ranges of depth values may be handled in a similar fashion.

FIG. 3B shows a graph 304 of an example set of tent functions. Multiple (e.g., 5 or any number i) tent functions may be each be defined by respective points $a_i$, $b_i$, and $c_i$. As shown, five tent functions are shown for (e.g., for creating 5 CDMs 118). For each depth value x, two depth function values $w_{j1}(x)$ and $w_{j2}(x)$ can be computed by image processing application, each contributing to different component depth map in different depth ranges. Consequently, each depth value x in a respective position in depth matrix d will contribute to values in the respective position in two CDMs.

FIG. 3C shows a formula 306 for computing each depth function value $w_i$ (e.g., for i in range 1-5) based on tent functions 304 in FIG. 3B. As shown the blending function 306 maps each depth value to at most two adjacent CDMs, and CDM values at other CDMs are zeroes. The formula 306 is reversible, as explained below.

FIG. 3D depicts an example formula 308 for reversing depth blending (e.g., depth blending in accordance with formula 306), in accordance with some embodiments of this disclosure. In particular, depth data d is recovered based on depth function values $w_{j1}(x)$ and $w_{j2}(x)$ that were computed, e.g., as shown in FIG. 3C.

While tent functions were shown in FIGS. 3A-3C, any suitable blending function may be used instead (e.g., sinusoid functions).

In some embodiments, blending functions result in values that typically add up to the maximum depth value (255, when using 8 bit/pixel or to 2^n−1 when using n bit/pixel). This is a property known as "partition of unity", referring to expressing blending weights scaled between 0-1 (for any bit/pixel). This requirement can be fulfilled with an infinite number of suitable functions. In addition to linear (tent) functions, various other blending functions may be used, including polynomial, (piecewise) sinusoidal functions, spline functions, sc. bump functions (and their complements), blending by smooth transition functions, and different variations approximating partition of unity (e.g., using Friedrich's mollifiers).

Figure 4:
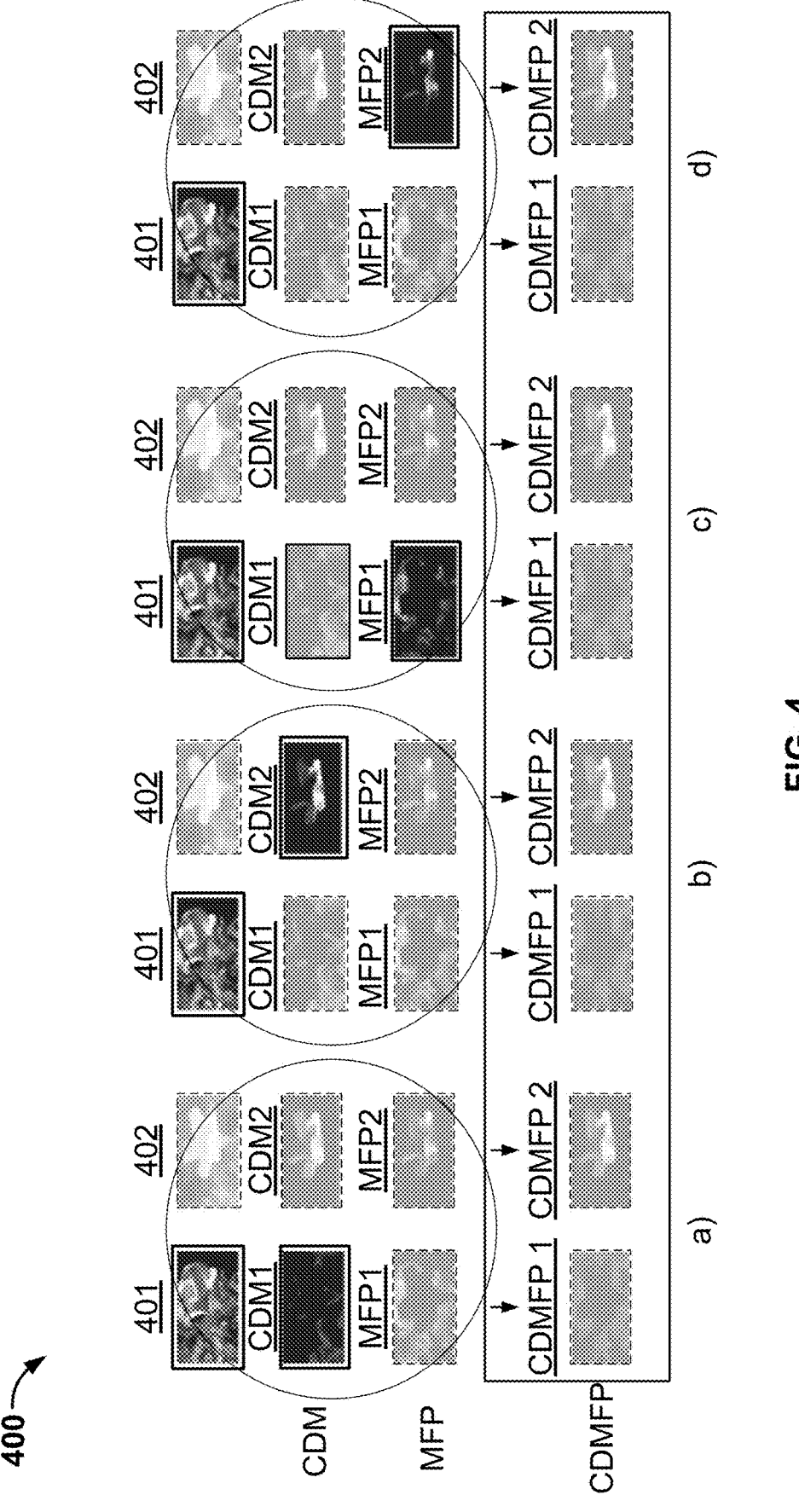
FIG. 4 shows an illustrative example of selection options for a two-level decomposition when texture data is selected as a default, in accordance with some embodiments of this disclosure.

FIG. 4 shows an illustrative example of selection options for a two-range multi-format presentation when texture data is selected as a default, in accordance with some embodiments of this disclosure. Example configurations a), b), c), and d) show a texture plus depth (V+D) image (top row) and its decomposition to two CDMs ($2^{nd}$ row) and MFPs ($3^{rd}$ row) and CDMFPs (lowest row). The grayed out images (e.g., unselected images) can be reconstructed using the chosen (selected) representative components.

Texture image 401 may be chosen as a default component and may not increase the number of configurations of the two decomposed multi-format components (MFPs and CDMs). FIG. 4 shows four options (circled) for decomposing a texture+depth map (V+D) image into a three component (e.g., CDM, MFP, and CDMFPs) multi-format presentation. Note that the images are schematic and illustrations of principle (e.g., not necessarily drawn to scale, etc.).

In some embodiments, original source images comprising texture image 401 (e.g., texture data) and a depth map 402 are decomposed into a two-level decomposition. Two CDMs may be formed by decomposing the depth map 402 into CDM1 and CMD2. Two MFPs may be formed by combining each CDM with the texture image 401 (e.g., multiplying by pixelwise multiplication, scaling, weighting, combining, or any combinations thereof). MFP1 may be formed by multiplying CDM1 by texture image 401, and MFP2 may be formed by multiplying CDM2 by the texture image 401. Two CDMFPs may be formed by combining each CDM with the depth map 402 (e.g., multiplying by pixelwise multiplication, scaling, weighting, combining, or any combinations thereof). CDMFP1 may be formed by multiplying CDM1 by the depth map, and CDMFP2 may be formed by multiplying CDM2 by the depth map.

In some embodiments, texture image 401 is used as a default source image, and one CDM or one MFP is selected in the different configurations (e.g., selected CDM or MFP in each configuration is as follows: a) CDM1, b) CDM2, c) MFP1, and d) MFP2). From the texture image 401 and the selected CDM or MFP in each configuration, the unselected images can be reconstructed. For example, in configuration a) the depth map 402, CDM2, MFP1, MFP2, CDMFP1, and CDMFP2, can be reconstructed using the texture image 401 and CDM1. Details regarding reconstruction of the unselected images of the example of FIG. 4 in configuration a) can be found in descriptions of FIGS. 9 and 17.

In the example for FIG. 4, there are four compilations of representative images when two depth ranges are in use, and the total number of possible compilations for the representative images is four. Two different formats (CDM and MFPs) support four combinations with two depth ranges (columns). For example, in FIG. 4 there are two depth ranges and each configuration has two columns of images. The components CDM1, MFP1 and CDMFP1 in a first column may correspond to a first depth range, and the components CDM2, MFP2, and CDMFP2 in a second column may correspond to a second depth range. The depth ranges may correspond to columns in each configuration.

Table 1 shows a number of required multi-format images for coding and transmission (number of ranges/columns from 2 to 5 are shown) in accordance with some embodiments of this disclosure. For example, the required multi-format images for coding may refer to a minimum number of multi-format images to be selected as representative images (when texture image is chosen as a default) to be able to reconstruct the unselected images. Table 1 lists the number of possible components for a number of depth ranges (columns) (e.g., 2, 3, 4, and 5). In some embodiments, the texture image is chosen as a default (e.g., "1" in second column of Table 1 "Texture images"). In some embodiments, in addition to a default image texture, the need for representative components is one less than the supported number of depth ranges/columns (e.g., 1, 2, 3, and 4 in third column of Table 1). The total number of required multi-format images may be the sum of second column and third column in Table 1 (e.g., 2, 3, 4, 5 in fourth column of Table 1).

TABLE 1

Number of required multi-format images for coding and transmission (number of ranges/columns from 2 to 5 are shown) in accordance with some embodiments of this disclosure.

| Number of depth ranges | Texture images | Number of required multi-format images (formed by depth blending) | Total number of required multi-format images | Number of possible configurations (while texture is a default) |
|---|---|---|---|---|
| 2 | 1 | 1 | 2 | $(2!/1!) \times 2 = 4$ |
| 3 | 1 | 2 | 3 | $(3!/2!) \times 2^2 = 12$ |
| 4 | 1 | 3 | 4 | $(4!/3!) \times 2^3 = 32$ |
| 5 | 1 | 4 | 5 | $(5!/4!) \times 2^4 = 80$ |

The total number of alternative multi-format representatives (cf. the last column in Table 1) may be determined as follows:

$$\text{Total number of options} = (L!/(L-1)!) \times 2^{(L-1)}$$

For two formats/rows (for CDMs and MFPs) and L ranges/columns:

Total number of options =

(number of ways to choose maximum − 1 number of *cols*)×

(number of ways to choose one image from each column).

For example, for L=4, Total number of options=4×8=32 (cf. Table 1).

The number of optional configurations may increase fast by increasing the number of depth ranges/columns.

Figure 5:
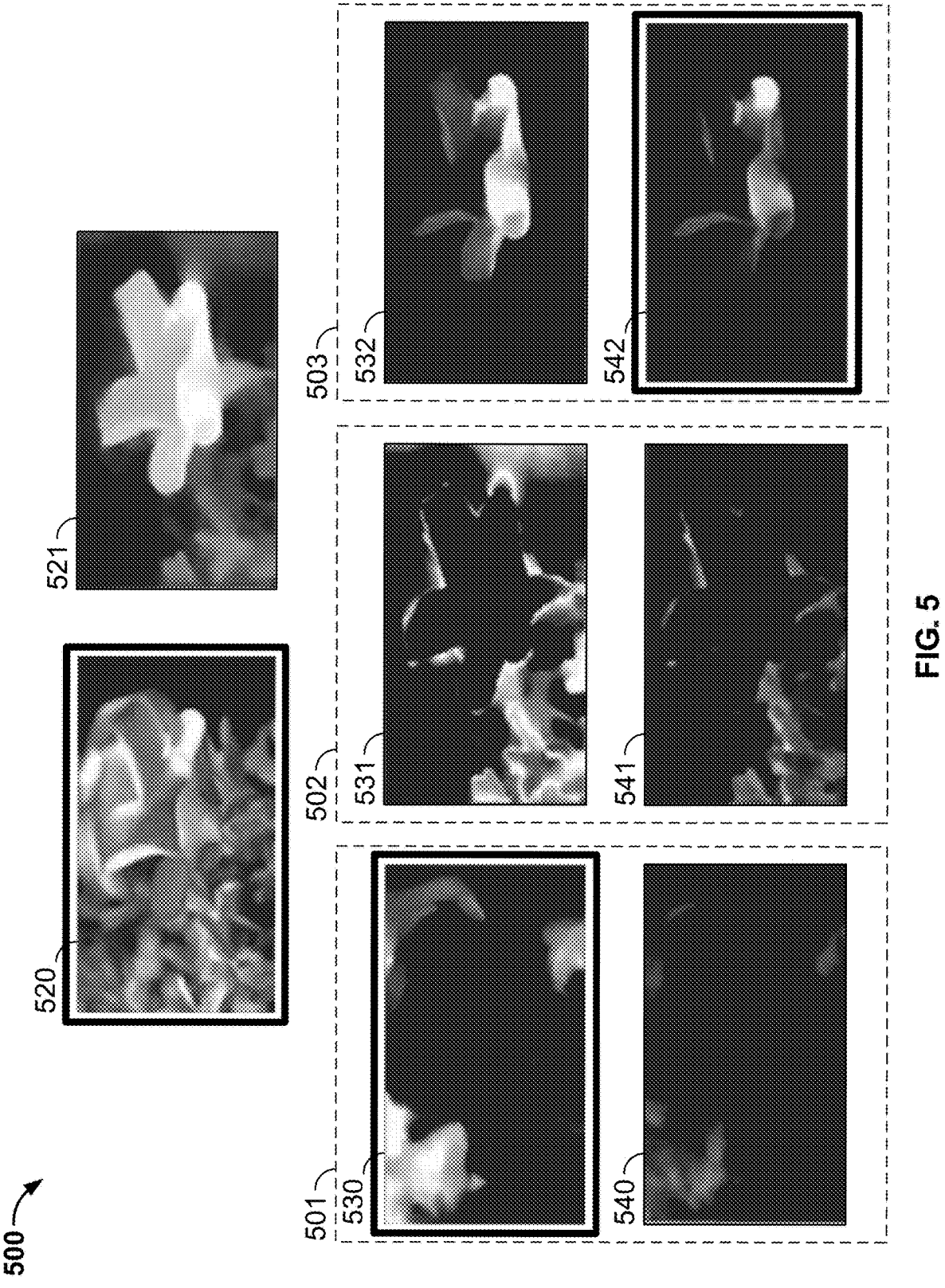
FIG. 5 shows an illustrative example of a selection option for a three-level decomposition when texture data is selected as a default, in accordance with some embodiments of this disclosure.

FIG. 5 shows an illustrative example of a selection option for a three-level decomposition when texture data is selected as a default, in accordance with some embodiments of this disclosure. The example shown in FIG. 5 is one example of selecting an adequate number of supported multi-format images from a three-range decomposition. The example of FIG. 5 shows chosen source images (=representative images) for a three-component multi-format presentation using a texture plus depth (V+D) image (top row), and its CDM decomposition (middle row) and MFP decomposition (bottom row).

In the example of FIG. 5, with three depth ranges, there may be a total of twelve adequate compilations of source images (cf. Table 2). Using texture as a default component, the system may select any source image from all but one column in order to form a complete multi-format presentation. For example, the source images to be selected from may be: first CDM 530, second CDM 531, third CDM 532, first MFP 540, second MFP 541, and third MFP 542. With three depth ranges, FIG. 5 shows three columns 501, 502, and 503. Each column may represent a depth range (e.g., column 501 includes first CDM 530 and first MFP 540 corresponding to a first depth range, column 502 includes second CDM 531 and second MFP 541 corresponding to a second depth range, etc.). The system may select a source image from all but one column (e.g., select a source image from two of the three columns 501, 502, and 503) as representative images to form a complete multi-format presentation. In the example of FIG. 5, the first CDM 530 from the first column 501 and the third MFP 542 from the third column 503 are selected as representative images.

Missing components can be reconstructed based either on the complementary properties of depth blended components (implied by the partition of unity property by the depth blending functions), or by using knowledge of the relation of depth blended components and using the complementary properties. In the example of FIG. 5, missing components (e.g., unselected components, omitted components) may include the second CDM 531, the third CDM 532, the first MFP 540, the second MFP 541.

Complementary Properties May be:

A missing CDM can be formed knowing that the sum of CDMs is a fully saturated (white) image (cf. partition of unity)

A missing MFP can be formed if n−1 MFPs are known (by applying partition of unity and the knowledge of the texture image)

Relations of Depth Blended Components May be:

A missing MFP can be formed by the corresponding CDM (provided it exists) (e.g., a decoded or reformed CDM) and the texture image (i.e. by the depth blending process)

A depth map can be formed by reverse depth blending after first deriving a full set of MFPs or CDMs Both sets of reconstruction rules may be implications of the way decompositions are made, i.e. depth blending with functions fulfilling partition of unity. An example process for forming multi-format components in the receiver can be found in the descriptions of FIGS. 9 and 17.

In some embodiments, CDMFPs may be a format that can be reconstructed. For example, CDMFPs may be formed by decomposing a depth map to CDMs with depth blending functions, and by weighting (multiplying) the depth map with each CDM.

A procedure for forming MFPs, CDMs and CDMFPs may be depth blending. Depth blending may be used for depth-based decomposition of textures for supporting natural accommodation (natural eye-focus). Forming CDMs may be a pre-step for forming MFPs, i.e. (V+D)→CDMs→MFPs. CDMs can be used to form focal planes for depth maps, i.e. CDMFPs. In some embodiments, CDMFPs are not used as representation images, but CDMFPs can be formed in the receiver for an output and further use.

FIG. 6 shows a summary of the decompositions by depth blending with examples of use, in accordance with some embodiments of this disclosure. For example, a depth data (depth map) may be decomposed to CDMs, and CDMs may be used to form CDMFPs. CDMFPs may be used for viewpoint synthesis to 3D depth surfaces. CDMFPs may be used to improve predictive depth coding. CDMs may be used for depth dependent compression and quality adjustment. CDMs may be used for decomposition for MFP presentations. Video and CDMs may be used to form MFPs. MFPs may be used to support for accommodation and for viewpoint synthesis to textured depth maps (cf. DIBR). Video, CDMs, and MFPs may be used for all the above-mentioned purposes for FIG. 6. Video, CDMs, and MFPs may be used for depth dependent compression and quality adjustment, Video, CDMs, and MFPs may be used for general flexibility.

Source formats may have a property that they can be formed from or converted between each other. Source images may form a hierarchy or matrix of images, in which every depth range except one may be represented by one image in any of the supported formats. The one depth range without a representative image can be completed (generated, reconstructed) using the complementary properties of depth blending functions (i.e., partition of unity, and reversibility of depth blending operations).

The disclosed multi-format approach may replace depth maps with multi-format images/decompositions obtained by depth blending. Component images may represent image properties on a chosen number of depth ranges. Corresponding image content may be reduced w.r.t the original depth map and/or texture (e.g., if there are no objects on a certain depth range, there may be no content either).

Although the number of images may be increased from the original (cf. the conventional pair of texture and depth images), increasing the number of components may not increase redundancy or overhead. Instead, the component images may be complementary, more compact, and straight-forward to encode, and may produce less bits than the original texture-plus-depth image pair.

Although the luminance distributions of component images may differ from the original texture or depth map components, the results may appear to be similar and used as an option to be coded with existing video coding methods.

Figure 7:
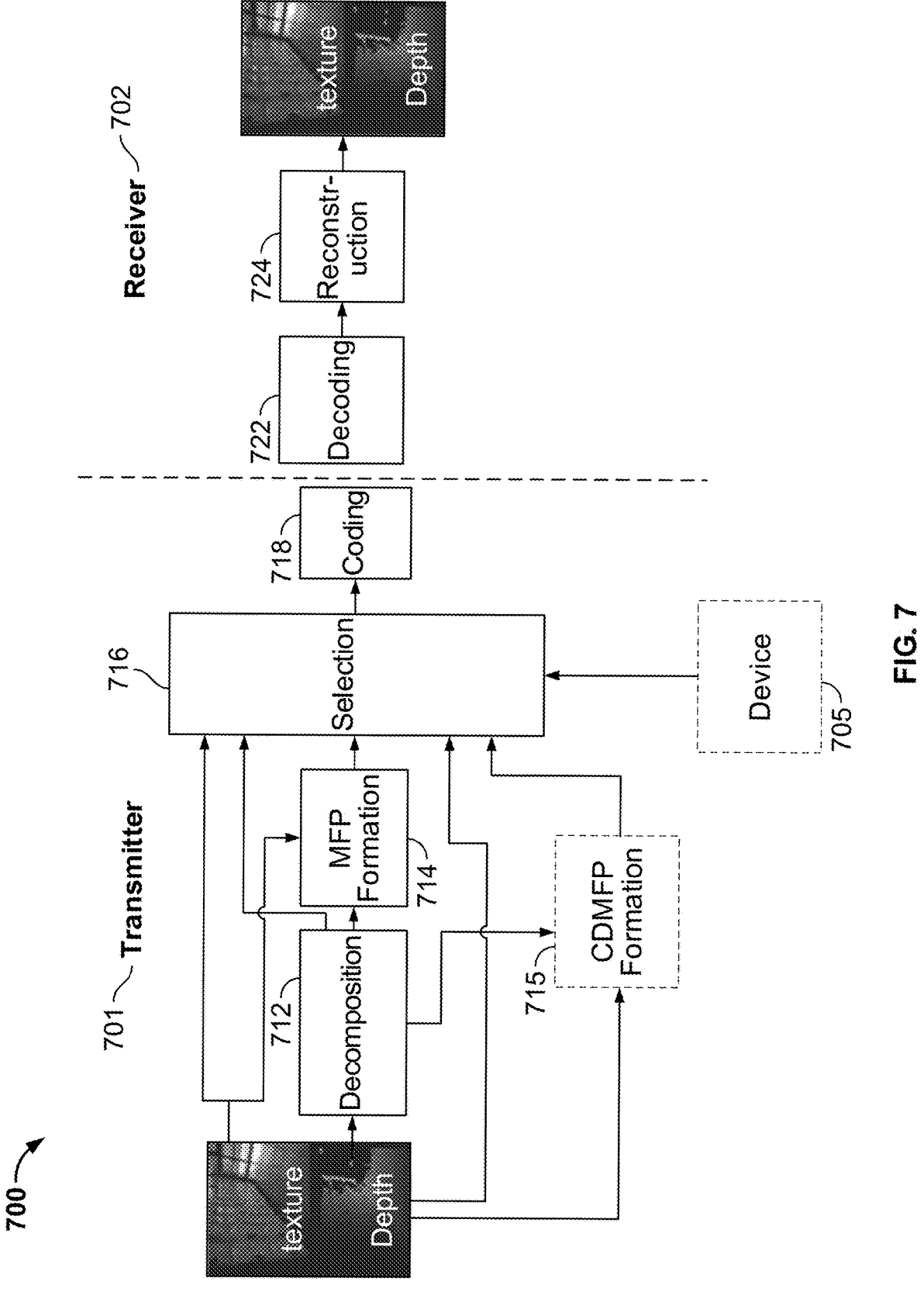
FIG. 7 shows an illustrative example of a simplified schematic block diagram for using a multi-format representation for coding, transmission, and decoding video and texture data, in accordance with some embodiments of this disclosure.

FIG. 7 shows an illustrative example of a simplified schematic block diagram for using a multi-format representation for coding, transmission, and decoding texture and depth data, in accordance with some embodiments of this disclosure. The system 700 may include a transmitter 701 and a receiver 702. The transmitter 701 may access or receive as an input image data (e.g., texture data and a depth map) and may output coded selected data for transmission. The receiver 702 may receive the coded selected data as input and may generate a reformed image data (e.g., reformed texture data and reformed depth map) from decoded selected data. In some embodiments, the system 700 may include additional or different entities. For example, although not shown in FIG. 7, system 700 may include a sync streaming block to synchronize multiple outputs from the coding block 718. For example, sync streaming block may receive input signals and syncs the received input signals to generate synced output signals. In some embodiments, the output of the transmitter may include data that is synchronized (e.g., in a container file, or sequentially but with markings that allow them to be re-synchronized). For example, markings may be made in stream headers of associated data that allows for synchronization.

The transmitter 701 may include a decomposition block 712, an MFP formation block 714, a CDMFP formation block 715, a selection block 716, and a coding block 718. In some embodiments, the CDMFP formation block 715 is optional. In some embodiments, transmitter 701 may include different or additional blocks.

The decomposition block 712 may decompose a depth map into component depth maps. The input to the decomposition block 712 may be an input a depth map from the image data. The output of the decomposition block 712 may be a set of component depth maps CDMs. In some embodiments, the decomposition block 712 generates CDMs from the depth map using depth blending techniques. For example, decomposition block 712 generates the component depth maps using pixel-by-pixel processing of the depth map using the depth blending functions. The decomposition block 712 may generate n CDMs from a depth map, where n is an integer greater than 1.

The MFP formation block 714 may generate MFPs from texture image and a depth map. The input to the MFP formation block 714 may be texture data and a set of CDMs (e.g., n CDMs, where n is an integer greater than 1). The MFP formation block 714 may generate a set of MFPs from the set of CDMs and the texture data. Each CDM of the set of CDMs may be multiplied (e.g., pixelwise multiplication) by a texture data to generate a respective MFP. The output of the MFP formation block may be a set of MFPs.

The CDMFP formation block 715 may generate CDMFPs from CDMs and a depth map. The input to the CDMFP formation block 715 may be a depth map and a set of CDMs (e.g., n CDMs). The CDMFP formation block 715 may generate a set of CDMFPs from the set of CDMs and the depth map. Each CDM of the set of CDMs may be multiplied (e.g., pixelwise multiplication) by a depth map to generate a respective CDMFP. The output of the MFP formation block may be a set of CDMFPs (e.g., n CDMFPs, where n is an integer greater than 1).

The selection block 716 may select a subset of data from the texture data, depth map, CDMs, MFPs, and CDMFPs. The input of the selection block 716 may be a texture image, a depth map, CDMs, MFPs, and CDMFPs. The selection block 716 may select the subset of data such that the selected subset of data may reconstruct the texture image, the depth map, and the source images in the configuration (e.g., full set of CDMs, MFPs, and CDMFPs). In some embodiments, the selection block 716 may select texture image as a default, and select additional components (e.g., selected CDMs and MFPs) as source images representative of the original source image (texture and data format) that may be used to reconstruct the texture image and depth map (and the full set of source images). The output of the selection block 716 may be a subset of data from the texture data, depth map, CDMs, MFPs, and CDMFPs.

In some embodiments, the selection block 716 may select a subset of data based on selection information data. The selection information data may include information relating to application type and/or user preferences. Application type information may include the type of application the transmitted information will be used for (e.g., TV, S3D, 6DoF, etc.). User preference information may be a setting that may indicate a selection preference of the user. For example, a user preference may be for a preference for a particular level or quality of images the user would like to view.

Selection information data may be obtained from a device 705. The device 705 may be a user device including user preferences. The device 705 may be a storage device (e.g., storage database) which may include information including user preferences or other selection information data. In FIG. 7, the device 705 is included in the transmitter 701; however in some embodiments the device 705 is separate from the transmitter 701. Details regarding selection information data and selection of source images based on selection information data can be found in descriptions of FIG. 8.

In some embodiments, selection block 716 may select a minimum number of images for reconstructing a set of output formats. For example, with n depth ranges (e.g., n CDMs and n MFPs), the selection block 716 may select a set of n source images (e.g., texture data and n−1 selected CDMs and MFPs, texture data and n−1 selected CDMs, or texture data and n−1 selected MFPs).

In some embodiments, selection block 716 may select more than a minimum number of images for reconstructing a set of output formats. For example, with n depth ranges (e.g., n CDMs and n MFPs), the selection block 716 may select a set of N+1 source images (e.g., texture data and n selected CDMs and MFPs, texture data and n selected CDMs, or texture data and n selected MFPs). Selecting additional source images may add redundancy, address (assign) and improve quality, increase the number of multi-format options for coding and transmission, and ease up forming and using output compositions/formats.

In some embodiments, selection block 716 may select depth map as a default selected source image. In some embodiments, selection block 716 may not select any default components (texture or depth).

In some embodiments, selection block 716 may select multiformat images so that the texture can be reconstructed in the decoder (e.g., receiver 702, reconstruction block 724, etc.) when it is not selected as a source image (e.g., despite not coding and sending texture explicitly). The selection block 716 may select multi-format components so that texture from all depth ranges is used when forming the multi-format components. For example, the selection block 716 may select MFPs from all distances (e.g., select each MFP from a set of n MFPs). The selection block 716 may select other depth-dependent components for adjusting quality and/or forming a corresponding depth map.

The coding block 718 may code data and output coded data. Coded data may be data that is no longer in a form of an image such as a frame of pixels. The coding block 718 may replace the input signal values with (statistically) shorter codes to reduce bits. The input of the coding block 718 may be the subset of selected data. For example, the subset of selected data may be the texture data and selected additional components (e.g., selected CDMs and MFPs). In some embodiments, as a default, source images in various formats may be coded separately, and due to their specific properties may get individual and largely independent errors when coded. In some embodiments, source images may be jointly coded. By jointly coding several components, coding efficiency may be increased (producing less bits). For example, some components may not be totally independent, as an object or surface can extend over several components (e.g., CDMs, MFPs). In such cases, the coding block 718 may apply a predictive method for jointly coding between several (neighboring) components. In some embodiments, there may be multiple coding blocks. For example, there may be a separate coding block for texture data in embodiments where texture data is selected as a default.

The receiver 702 may include a decoding block 722 and a reconstruction block 724. In some embodiments, receiver 702 may include different or additional blocks.

The decoding block 722 decodes received data. The decoding block 722 may decode received data by replacing statistically shorter codes with corresponding expanded bits. The input to the decoding block 722 may be encoded selected data transmitted by the transmitter 701. The decoding block 722 may decode the encoded selected data to generate decoded selected data. In some embodiments, there may be multiple decoding blocks. For example, there may be a separate decoding block for texture data in embodiments where texture data is selected as a default. In some embodiments, decoding block 722 may receive a container of encoded data, and the decoding block 722 may decode the container to retrieve the decoded selected data.

The reconstruction block 724 may generate reformed data based on the decoded selected data. For example, the reconstruction block 724 may use the decoded selected data to generate reformed data (e.g., texture data, depth map, CDMs, MFPs, and/or CDMFPs that were not selected). In some embodiments, reformed data may include decoded data and reconstructed data. For example, the reconstruction block 724 may generate reformed image data which may include reformed texture data and reformed depth map. In some embodiments, the reformed texture data may be decoded texture data, and the reformed depth map may be a reconstructed depth map. As another example, the reconstruction block 724 may generate n reformed CDMs and n reformed MFPs. The n reformed CDMs may include decoded CDMs (e.g. corresponding to selected CDMs) and reconstructed CDMs (e.g., corresponding to missing or omitted CDMs). The n reformed MFPs may include decoded MFPs (e.g. corresponding to selected MFPs) and reconstructed MFPs (e.g., corresponding to missing or omitted MFPs). The reconstruction block 724 may output reformed data. In some embodiments, the reconstruction block 724 may output the set or a subset reformed texture data, depth map, CDMs, MFPs, and CDMFPs. In some embodiments, after forming and converting coded source images to unified formats, coding results may be averaged to improve coding quality.

Figure 8:
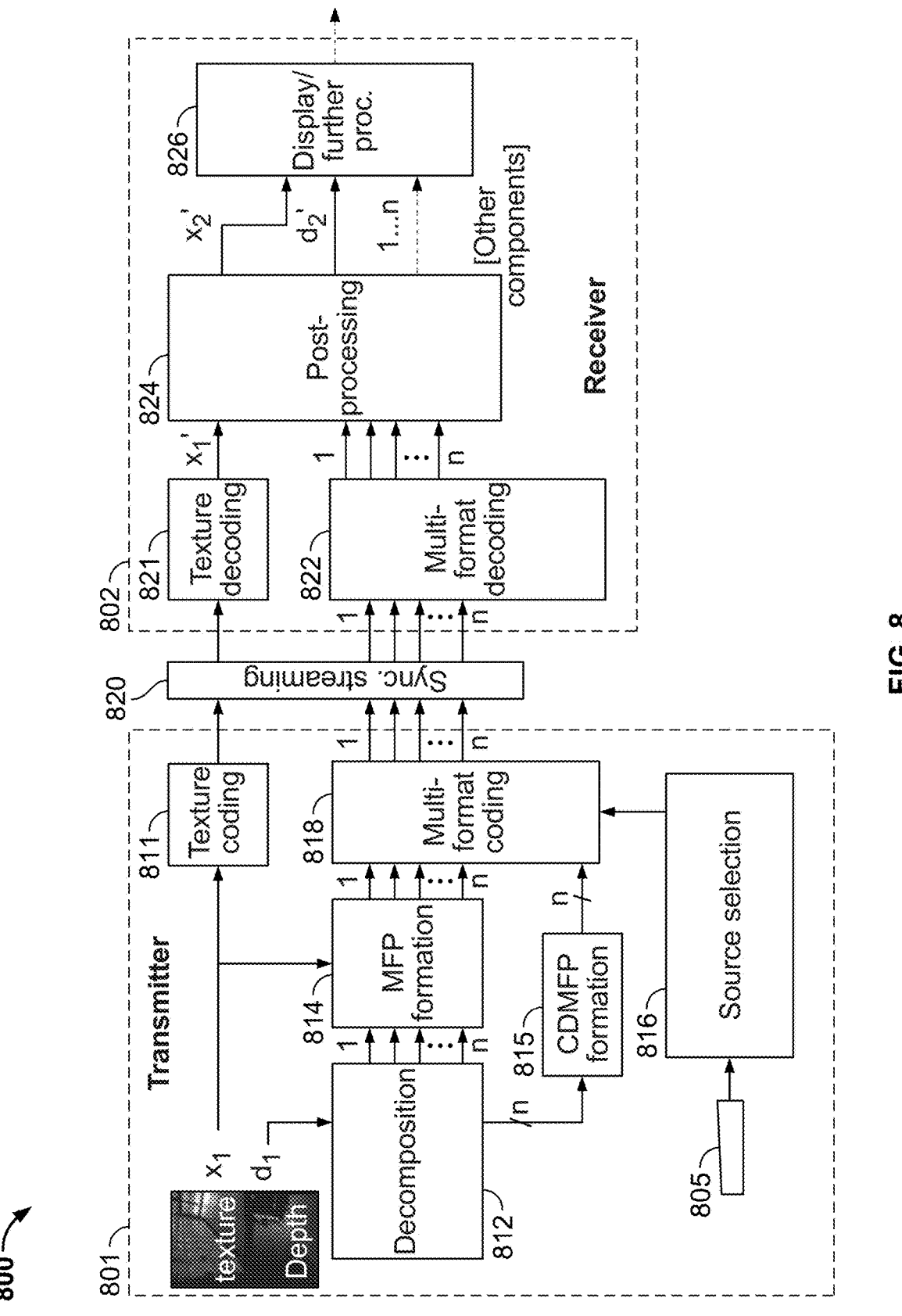
FIG. 8 shows an illustrative example of a schematic block diagram for using a multi-format representation including texture data for coding, transmission, and decoding video and texture data, in accordance with some embodiments of this disclosure.

FIG. 8 shows an illustrative example of a schematic block diagram for using a multi-format representation including texture data for coding, transmission, and decoding video and texture data, in accordance with some embodiments of this disclosure. The system 800 includes a transmitter 801 and a receiver 802. In some embodiments, the system 800 may include additional or different entities. FIG. 8 shows texture signal $x_1$ and depth signals $d_1$ (e.g., texture image and depth map) as inputs to the transmitter 801. In some embodiments, transmitter 801 corresponds to (e.g., is the same as, similar to) transmitter 701 except that in the example of FIG. 8, texture data is selected as a default and encoded separately and that additional selection of data is made from source images (e.g., CDMs, MFPs, and CDMFPs). In some embodiments, receiver 802 corresponds to (e.g., is the same as, similar to) receiver 702 except that in the example of FIG. 8, texture data may be received and decoded separately from the selected source images.

In FIG. 8, the decomposed components for each depth range may be numbered from 1 to n, or may be indicated by a number n, beside a connection for n parallel signals. Signal $x_1$ may refer to the texture (video) signal, and signal $x_1'$ may correspond to the decoded version of $x_1$. Signals $d_1$ and $d_1'$ may refer to the original and decoded depth signals, respectively. However, FIG. 8 does not show a decoded depth signal $d_1'$ and instead shows a reconstructed depth signal $d_2'$. Subscript 2 for output signal $x_2'$ may emphasize that signal $x_1'$ may be improved by the received multiformat components. The subscript 2 for depth signal $d_2'$ may emphasize that the signal may not be directly generated from a coded version of $d_1$. A benefit of the disclosed approach may be that policies for adjusting coding quality can be varied for the chosen multi-format components. These policies may be managed by the source selection block 816 in FIG. 8.

The transmitter 801 includes a texture coding block 811, decomposition block 812, MFP formation block 814, CDMFP formation block 815, source selection block 816, and multi-format coding block 818. In some embodiments, the decomposition block 812, MFP formation block 814, and CDMFP formation block 815 of FIG. 8 correspond to (e.g., is the same as or similar to) decomposition block 712, MFP formation block 714, and CDMFP formation block 715, respectively, of FIG. 7. In some embodiments, transmitter 801 may include different or additional blocks.

In some embodiments, the texture coding block 811 of FIG. 8 corresponds to (e.g., is the same as or similar to) coding block 711 of FIG. 7, except the inputs and outputs differ. For example, the coding block 711 may have as input and code any of texture data, depth map, CDMs, MFPs, or CDMFPs, while the texture coding block 811 of FIG. 8 may have as an input and code only texture data. Texture coding block 811 may code texture data. The input to the texture coding block 811 may be a texture (video) signal $x_1$. The texture coding block 811 may encode the texture signal $x_1$ to generate encoded texture signal for transmission by the transmitter 801.

Decomposition block 812 may decompose a depth map into a stack of CDMs. The input to the decomposition block 812 may be a depth data $d_1$, and the output may be a set of n CDMs (e.g., n is an integer greater than 1). Although not shown in FIG. 8 for simplicity, the output of decomposition block 812 (e.g., n CDMs) may be an input to the multi-format coding block 818.

MFP formation block 814 may generate MFPs from CDMs. The input to the MFP formation block 814 may be a set of n CDMs, and the output may be a set of n MFPs.

CDMFP formation block 815 may generate CDMFPs from CDMs and depth data. For example, the input to the MFP formation block 814 may be a set of n CDMs and the depth signal $d_1$ and the output may be a set of n MFPs. Although not shown in FIG. 8 for simplicity, the depth signal $d_1$ may be an input of the CDMFP formation block 815.

In some embodiments, a source selection block 816 of FIG. 8 corresponds to (e.g., is the same as or similar to) a selection block 716 of FIG. 7 except the inputs and outputs differ. For example, the source selection block 816 may have as an input selection information data and may output an indication of which component source images (e.g., CDMs, MFPs, or CDMFPs) are selected, while the selection block 716 may have as an input selection information data and a full set of source images (e.g., texture data, depth data, CDMs, MFPs, and CDMFPs) and output the selected source images.

The source selection block 816 may select a subset of source images. The selection may be based on selection information data. The input to the source selection block 816 may be selection information data. The selection information data may include information relating to application type and/or user preferences. Application type information may include the type of application the transmitted information will be used for (e.g., TV, S3D, 6DoF, etc.). User preference information may be a setting that may indicate a selection preference of the user. For example, a user preference may be for a preference for a particular level or quality of images the user would like to view.

The selection information data may be obtained from a device 805. In some embodiments device 805 corresponds to (e.g., is the same as, similar to) device 705. The device 805 may be a user device including user preferences. The device 805 may be a storage device (e.g., storage database) which may include information including user preferences or other selection information data. In FIG. 8, the device 805 is included in the transmitter 801; however in some embodiments the device 805 is separate from the transmitter 801.

The source selection block 816 may choose the set of source images and their quality based on the application or a user preference. For example, if a user preference indicates that the user prefers high quality images, source selection block 816 may select additional data to be sent to a client device associated with the user (e.g., instead of selecting n source images, selecting N+1 source images or an additional source image, or one or more additional source images to be sent). Having a representative component for every depth range instead of n−1 range may add some redundancy to a minimum representation and address (assign) and improve quality.

The source selection block 816 may select a quality of image based on an application type. For example source selection block 816 may choose high quality source images for particular application types (e.g., 6DoF applications). The source selection block 816 may send the multi-format coding block 818 an indication of what type of quality version of images may be used. For example, the multi-format coding block 818 may have different quality version multi-format images, and the source selection block 816 may send an indication to the multi-format coding block 818 to select a particular quality version of multi-format images.

In some embodiments, the source selection block 816 may choose the compilation of source images to increase or reduce the quality at different depth ranges (distances). For example, the source selection block 816 may select a CDM at a greater distance, using bits for coding a CDM at a greater distance so that far away depth properties are emphasized, and select a closer MFP, using bits for coding a closer MFP so that both nearby texture and depth are emphasized for quality.

By increasing the number of layers in the CDM and MFP decomposition, the selectiveness of the above-described weighting of properties may be increased (cf. Table 1).

Depending on the application or user's needs, the output can be chosen from many possible options. For example, either outputs with accommodation support (i.e., MFPs) or without such support (e.g., V+D for stereoscopic 3D rendering) can be chosen, depending on display capabilities. While V+D format may provide comparable benefits for output flexibility, the choice multi-format components (e.g., allocation of bits between multi-format components) may adjust the used distortion measure, which may enable assigning different quality to chosen features (represented by multi-format components).

Allocating bits (quality) between multi-format components may mean adjusting the used distortion measure. By choosing one of the several optional formats for coding the distortion metrics may be changed for the coding. When coding a texture, the metrics is depth agnostic. By choosing/coding an MFP, the metrics is texture-plus-depth-dependent on a corresponding chosen distance range. By coding a CDM, the metrics is based only on distances.

Normal metrics may not necessarily comply well with the perceived quality. The quality depends on the contents and the use of the content (e.g. viewing from different distances and synthesized viewpoints). By enabling choosing between various texture and depth dependent content components, the disclosed approach may offer flexibility to mitigate this problem. Using an altered distortion measure may not necessarily show any increase in traditional signal to noise ratio (SNR or PSNR). On the other hand, e.g. the possibility to separately weight depth ranges by quality suggests improvements in specific use cases. For example, being able to present certain depth ranges with better quality may improve synthesizing content or 3D viewpoints for those areas in 3DoF or 6DoF type of 3D applications.

The output of the source selection block 816 may be selector data. The selector data may include information indicating which source images are selected. The selector data may indicate which source images are selected.

In some embodiments, the selector data (e.g., where texture is selected as a default) may include a table, a matrix, or any suitable format for representing whether a source image is selected. For example, a matrix of size 2×2 (e.g., two rows and two columns) may be used to represent a selector data for the example of FIG. 4 with CDMs and MFPs representing two depth ranges. Each row may represent a type of component image (e.g., first row may represent CDM, second row may represent MFP) and each column may represent a different depth range (e.g., first column may represent a first depth range, second column may represent a second depth range). As another example, a matrix of size 2×3 (e.g., 2 rows and 3 columns) may be used to represent a selector data for the example of FIG. 5 with CDMs and MFPs representing three depth ranges. Each entry in the matrix may indicate whether a source image is selected. In the example of FIG. 4, the first row and first column of the matrix may correspond to CDM1 (component depth map corresponding to a first depth range). To represent this option a) of FIG. 4, the selector data may have an entry of "1" in the first column and first row, indicating that CDM1 is a selected source image. The other entries of the table (e.g., row 1, column 2; row 2, column 1; row 2, column 2) may be "0" to indicate that CDM2, MFP1, and MFP2 are not selected.

Multi-format coding block 818 may code a selected subset of multi-format components. The input to the multi-format coding block 818 may include a selector data. The source selector data may indicate which multi-format components to select to be coded. The multi-format coding block 818 accesses the components based on the selector data and encodes the selected components. Although not shown in FIG. 8, in some embodiments the output of multi-format coding block 818 may transmit more than n selected images and the multi-format decoding block 822 may receive more than n encoded selected images.

Sync streaming block 820 receives input signals and syncs the received input signals to generate synced output signals. For example, the input to the sync streaming block 820 may be encoded texture data and n encoded multi-format components. The texture data may be encoded and ready for transmission before the multi-format components are generated, selected, and encoded for transmission. The sync streaming block 820 may delay streaming the encoded texture data until the encoded selected multi-format components are ready so that the encoded texture data and the encoded selected multi-format components are streamed together. The sync streaming block 820 may output synced encoded texture data with n encoded multi-format components. In some embodiments, the encoded texture data and the n encoded multi-format components may be transmitted in a synchronized manner (e.g., in a container file, or sequentially but with markings that allow them to be re-synchronized). For example, markings may be made in stream headers of associated data that allows for synchronization.

In some embodiments, the multi-format coding block 818 may select and encode n−1 multi-format components. The sync streaming block 820 may sync the encoded texture data with n−1 encoded multi-format components. In some embodiments, the encoded texture data and the n−1 encoded multi-format components may be transmitted in a synchronized manner (e.g., in a container file, or sequentially but with markings that allow them to be re-synchronized). For example, markings may be made in stream headers of associated data that allows for synchronization.

The receiver 802 includes texture decoding block 821, multi-format decoding block 822, post-processing block 824, and display/further processing block 826. In some embodiments, receiver 802 may include different or additional blocks.

In some embodiments, the texture decoding block 821 of FIG. 8 corresponds to (e.g., is the same as or similar to) decoding block 722 of FIG. 7, except the inputs and outputs differ. For example, the decoding block 722 may have as input and decode any of encoded texture data, depth map, CDMs, MFPs, or CDMFPs, while the texture decoding block 821 of FIG. 8 may have as an input and decode only encoded texture data. Texture decoding block 821 may decode the encoded texture data. For example, the input to texture decoding block 821 may be encoded texture data, and the output may be decoded texture data $x_1'$.

In some embodiments, the multi-format decoding block 822 of FIG. 8 corresponds to (e.g., is the same as or similar to) decoding block 722 of FIG. 7, except the inputs and outputs differ. For example, the decoding block 722 may have as input and decode any of encoded texture data, depth map, CDMs, MFPs, or CDMFPs, while the multi-format decoding block 822 of FIG. 8 may have as an input and decode only encoded multi-format data (e.g., CDMs, MFPs, and/or CDMFPs). Multi-format decoding block 822 may decode the selected subset of multi-format components. For example, multi-format decoding block 822 may decode n multi-format components. In some embodiments, multi-format decoding block 822 may decode a different number of multi-format components (e.g., n−1 multi-format components).

In some embodiments, the post-processing block 824 of FIG. 8 corresponds to (e.g., is the same as or similar to) reconstruction block 724 of FIG. 7. Post-processing block 824 may reconstruct "missing" components from decoded texture and multi-format components. For example the post-processing block 824 may reconstruct missing depth map, CDMs, MFPs, and CDMFPs using depth blending, inverse depth blending, and partition of unity. In some embodiments, the post-processing block 824 may generate reformed texture data $x_2'$ by summing (e.g., pixel by pixel) the set of decoded or reformed MFPs. The reformed texture data $x_2'$ may be of higher quality than a decoded texture data $x_1'$. The output of the post-processing block 824 may be a reformed texture image $x_2'$, reformed depth map $d_2'$, and reformed n additional components (e.g., n CDMs or n MFPs). In some embodiments, the output of post-processing block 824 may the set or a subset of reformed texture data, depth map, CDMs, MFPs, and CDMFPs. In some embodiments, the post-processing block 824 may choose an output format as defined by a user or application. For example, the post-processing block 824 may choose outputs with accommodation support (i.e., MFPs) or without such support (e.g., V+D for stereoscopic 3D rendering), as defined by a user or application (e.g., user preference, 3DoF, 3DoF+, 6DoF applications, etc.).

Display/further processing block 826 displays and/or performs further processing (e.g., further editing, or manipulation) on the texture data, the depth map, and the multi-format components. For example, the input into display/further processing block 826 may be a reformed texture image $x_2'$, reformed depth map $d_2'$, and reformed n additional components. In some embodiments, the input may include other components. The display/further processing (e.g., further filtering of image data) block 826 may display an image based on the reformed texture image $x_2'$, reformed depth map $d_2'$, and reformed n additional components. In some embodiments, further processing may be e.g., computer analysis for detecting and tracking objects at different distances (depth) of the scene.

Figure 9:
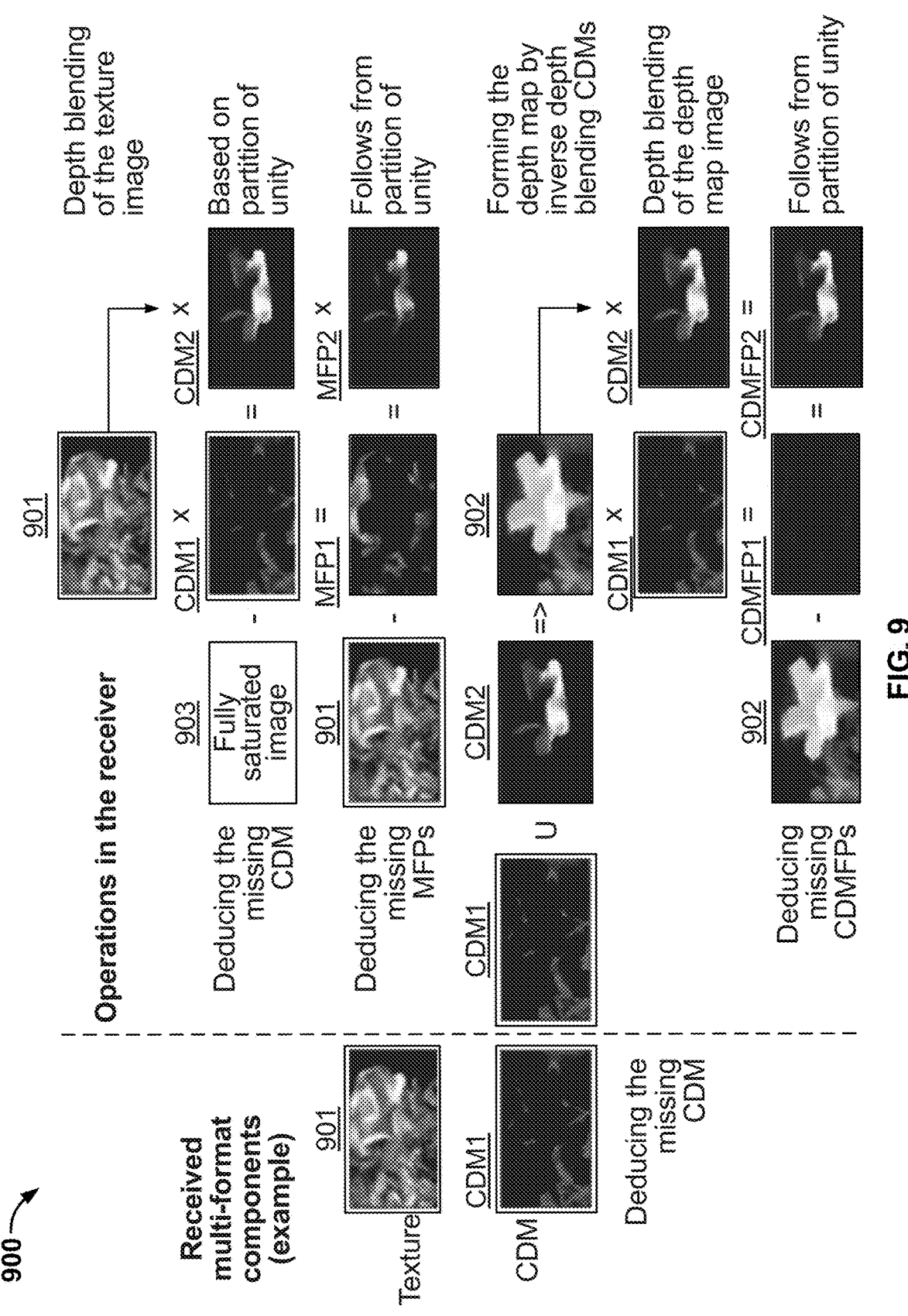
FIG. 9 shows an illustrative example of generating reformed additional content components, in accordance with some embodiments of this disclosure.

FIG. 9 shows an illustrative example of generating reformed additional content components, in accordance with some embodiments of this disclosure. FIG. 9 illustrates an example of processes for forming the whole set of output images in the receiver, using two received (coded) multi-format images. The example choice for multi-format images of texture data 901 and CDM1 in FIG. 9 corresponds to option a) of texture data 401 and component depth map CDM1 in FIG. 4. Note that the images are schematic and illustrations of principle (e.g., not necessarily drawn to scale, etc.). FIG. 9 is one example, and other cases may be processed in a similar way by following basic rules and processes of 1) the partition of unity and 2) depth blending and its inverse. There may be alternative ways and order of the processes to result in the same or similar multi-format component outputs. For example, there may be two alternative ways to derive a missing MFP (e.g., using depth blending or partition of unity). In some embodiments, deriving all output formats may not be necessary depending on the use case. In some embodiments, a thin client may derive a subset of the multi-format components.

In the example of FIG. 9, a receiver (e.g., receiver 702, receiver 802) may receive encoded data representing a texture data 901 and a component depth map CDM1. The receiver (e.g., decoding block 720, texture decoding block 821) may decode the encoded texture data to generate decoded texture data based on a corresponding coding method (e.g., of coding block 718, texture coding block 811). The receiver (e.g., decoding block 720, multi-format decoding block 822) may decode the encoded CDM1 to generate decoded CDM1.

The receiver may generate a reformed CDM based on the partition of unity. For example, the receiver may generate a reformed CDM2 by subtracting (e.g., by pixelwise subtraction) the decoded CDM1 from a fully saturated image. The computation of the reformed CDM2 is based on the partition of unity that a set of CDMs sum up to a fully saturated image 903. For example, with two depth ranges, two CDMs sum up to a fully saturated image.

The receiver may generate the reformed MFPs by depth blending of the texture image. For example, the receiver may generate the reformed MFPs by multiplying (e.g., by pixelwise multiplication) the texture data 901 by the respective CDMs. For example, the receiver may generate reformed MFP1 by multiplying texture data 901 by CDM1, and reformed MPF2 by multiplying texture data by the reformed CDM2. In some embodiments, the receiver may generate a reformed MFP using the partition of unity principle. For example, the receiver may generate a reformed MFP2 by subtracting (e.g., by pixelwise subtraction) a reformed MFP1 (generated by multiplying texture data 901 by CDM1) from the texture data 901.

The receiver may generate a reformed depth map by inverse depth blending CDMs. For example, the receiver may generate depth map 902 by inverse depth blending decoded CDM1 and reformed CDM2.

The receiver may generate reformed CDMFPs by depth blending of the depth map image. For example, the receiver may generate reformed CDMFPs by multiplying (e.g., by pixelwise multiplication) the depth map 902 by respective CDMs. For example, the receiver may generate CDMFP1 by multiplying the depth map 902 by decoded CDM1, and CDMFP2 by multiplying the depth map 902 by reformed CDM2 (generated by subtracting decoded CDM1 from a fully saturated image). In some embodiments, a missing CDMFP may be generated by using the partition of unity property. For example, CDMFP2 may be generated by subtracting a reformed CDMFP1 (generated by pixelwise multiplication of the depth map by CDM1) from the reformed depth map 902.

Figure 10:
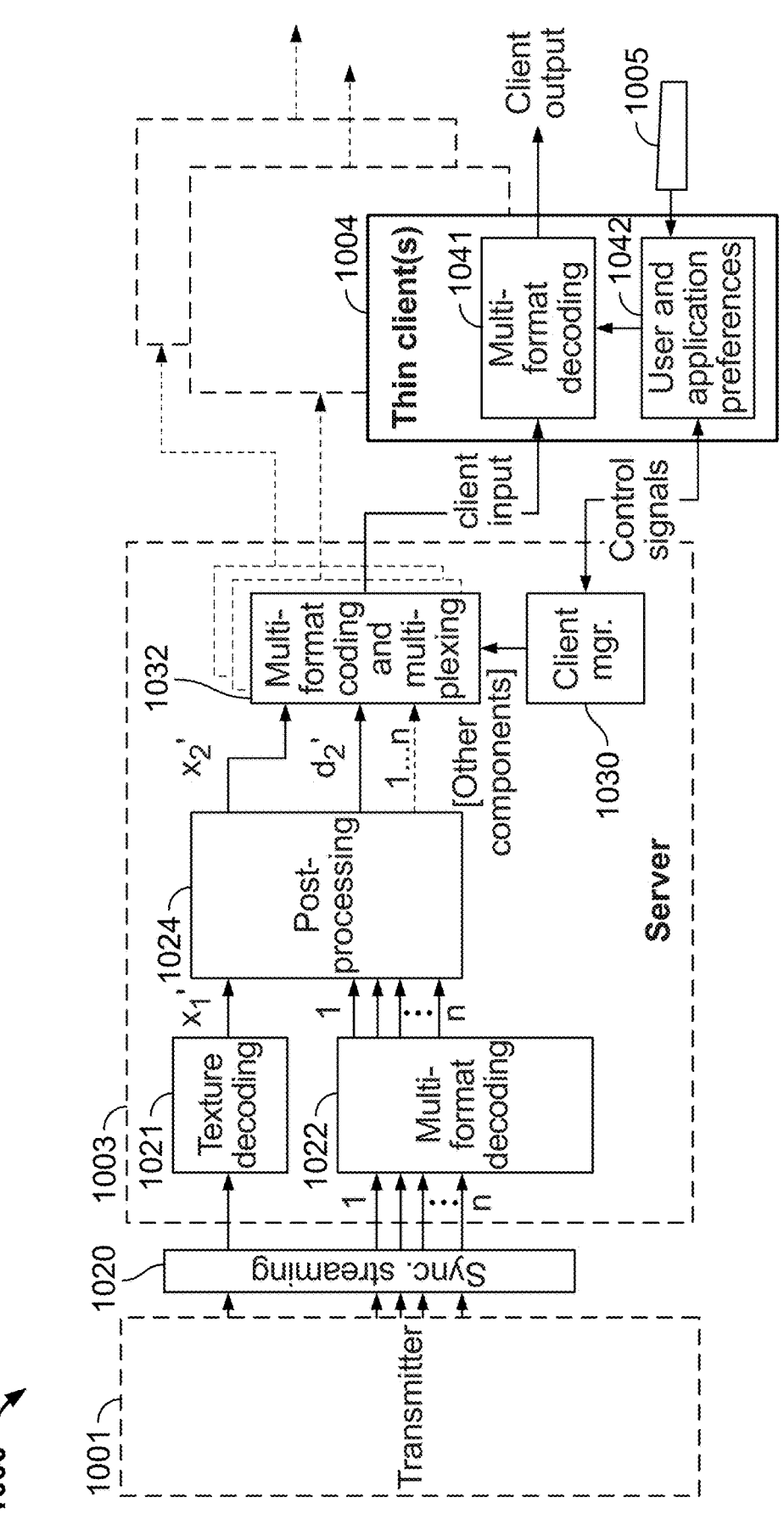
FIG. 10 shows an illustrative example of a schematic block diagram for using a multi-format representation including texture data with a server and thin client, in accordance with some embodiments of this disclosure.

FIG. 10 shows an illustrative example of a schematic block diagram for using a multi-format representation including texture data with a server and thin client, in accordance with some embodiments of this disclosure. The system 1000 includes a transmitter 1001, a server 1003, and one or more thin client devices 1004. In some embodiments, the system 1000 may include additional or different entities. In some embodiments, the transmitter 1001 and sync streaming block 1020 of FIG. 10 corresponds to (e.g., is the same as, is similar to) the transmitter 801 and sync streaming block 820, respectively, of FIG. 8.

In some embodiments, processing for reconstructing multi-format components is performed on a server for low-end (thin) client devices. A network server/content dispatcher may reconstruct the multi-format components. The server (e.g. on the network edge) may service several local clients by reconstructing (up to) a complete set of multi-format components. The server may support clients with less processing power. The server may keep track and manage the individual needs of multiple clients. In some embodiments, a fully individual service e.g. for enabling client-specific content quality is provided. In some embodiments, basic content is broadcast to the server(s) with only one quality level, from which various client streams are parsed.

The server 1003 includes texture decoding block 1021, multi-format decoding block 1022, post-processing block 1024, client manager block 1030, and multi-format coding and multiplexing block 1032. The texture decoding block 1021, multi-format decoding block 1022, and post-processing block 1024 of FIG. 10 correspond to (e.g., is the same as, is similar to) texture decoding block 821, multi-format decoding block 822, and post-processing block 824, respectively, of FIG. 8. In some embodiments, the server 1003 may include different or additional blocks.

The client manager block 1030 may keep track and manage needs of multiple clients. The input to the client manager block 1030 may be control signals from thin client device(s) 1004 indicating user and application preferences. The output of the client manager block 1030 may be a client selection signal indicating which components are to be selected and coded for the client (e.g., a particular client).

The multi-format coding and multiplexing block 1032 may select which signals to code based on the client selection signal from the client manager block 1030. For example, the input into multi-format coding and multiplexing block 1032 may be a reformed texture image $x_2'$, reformed depth map $d_2'$, and reformed n additional components. In some embodiments, the input may include other components. The multi-format coding and multiplexing block 1032 may code the selected signals. The output of the multi-format coding and multiplexing block 1032 may be the coded selected data which is transmitted from the server 1003. In some embodiments, the client manager block 1030 of FIG. 10 may correspond (e.g., is the same as, similar to) to the source selection block 816 of FIG. 8, except the inputs and outputs may differ. For example, client manager block 1030 may receive as input and manage multiple client selection signals from different client devices instead of receiving a selection signal from one device.

Thin client(s) 1004 may be user devices which may not have a lot of computing power. Thin client(s) 1004 may include a multi-format decoding block 1041. In some embodiments, the thin client(s) 1004 may include different or additional blocks. Device 1005 may provide user and application preferences data 1042 to thin client(s) 1004. The server 1003 (e.g., client manager 1030) may send and receive control signals based on the user and application preferences data 1042. The client manager 1030 may use these control signals to determine the subset of data to select.

Device 1005 may be a storage with user and application preferences. In some embodiments device 1005 corresponds to (e.g., is the same as, similar to) device 705 or device 805. The device 1005 may be a user device including user preferences. The device 1005 may be a storage device (e.g., storage database) which may include information including user preferences or other selection information data.

Multi-format decoding block 1041 may decode received data input. For example, the input to multi-format decoding block 1041 may be client input data. The multi-format decoding block 1041 may output decoded client input data as client output data. For example, client output data may be decoded selected data. In some embodiments, the multi-format decoding block 1041 may receive as an input, user and application preferences data 1042. The multi-format decoding block 1041 may decode the client input based on the user and application preferences data 1042. For example, the client input data from server 1003 may include texture data, depth map, set of CDMs and/or set of MFPs, etc., and the multi-format decoding block 1041 may decode a portion of client input data (e.g., set of MFPs) as client output based on the user application and preferences data 1042 (e.g., indicating use of MFPs to be displayed simultaneously e.g., using a stack of transparent displays and/or using spatial light modulators (SLMs) that are capable of rendering image content to varying distances, controlled by tailored phase functions).

FIG. 11 shows an illustrated proof for generating all component images from texture data and n−1 representative images in an n-component multi-format presentation, in accordance with some embodiments of this disclosure. Texture $T(x, y)$+depth map $D(x, y)$ is decomposed into a n component multi-format presentation (Case n=3). The representative images in an n−component multi-format presentation are:

texture $T(x, y)$ and
n−1 representative images:
$C_i(x, y)$ where $i=\{i_1, i_2, \ldots i_k\}$ (k CDMs),
$M_j(x, y)$ where $j=\{j_1, j_2, \ldots j_{n-k-1}\}$ (n−k−1 MFPs) and
$\{i_1, i_2, \ldots i_k\} \cap \{j_1, j_2, \ldots j_{n-k-1}\}=\emptyset$ (all the representatives are in different columns).

Because all the component images can be generated from texture and depth map (and texture is given), showing that the depth map $D(x,y)$ can be generated from any combination of the representatives would prove that all component images can be generated.

Case 1: $k=n-1$: all representatives are CDMs.

Because $\Sigma_i C_i(x,y)=255$ (e.g., fully saturated 8-bit image, maximum value is 255) and $n-1$ CDMs are known, the $n^{th}$ CDM can be calculated. When all CDMs are known, depth map can be calculated using inverse blending function. Value of 255 is used as an example for 8 bit data, full saturation for n-bit data would be a value of $2^n-1$.

Case 2: $k=0$: all representatives are MFPs.

Because $\Sigma_i M_i(x, y)=T(x, y)$, $T(x,y)$ and $n-1$ MFPs are known, the $n^{th}$ MFP can be calculated. When all MFPs are known, all CDMs can be calculated ($C_i(x, y)=T(x, y)/M_i(x, y)$) and the depth map can be calculated using inverse blending function.

Case 3: $k\neq0$ and $k\neq n-1$: there are k CDM representatives and $n-k-1$ MFP representatives.

Because all the representatives are from different columns ($\{i_1, i_2, \ldots i_k\}\cap\{j_1, j_2, \ldots j_{n-k-1}\}=\emptyset$), the missing CDMs ($C_j(x,y)$, where $j=\{j_1, j_2, \ldots j_{n-k-1}\}$) can be calculated using $C_j(x,y)=T(x,y)/M_j(x,y)$. Then $n-1$ CDMs are known ($n^{th}$ CDM can be calculated, all CDMs are known) and depth map can be calculated using inverse blending function.

Figure 12:
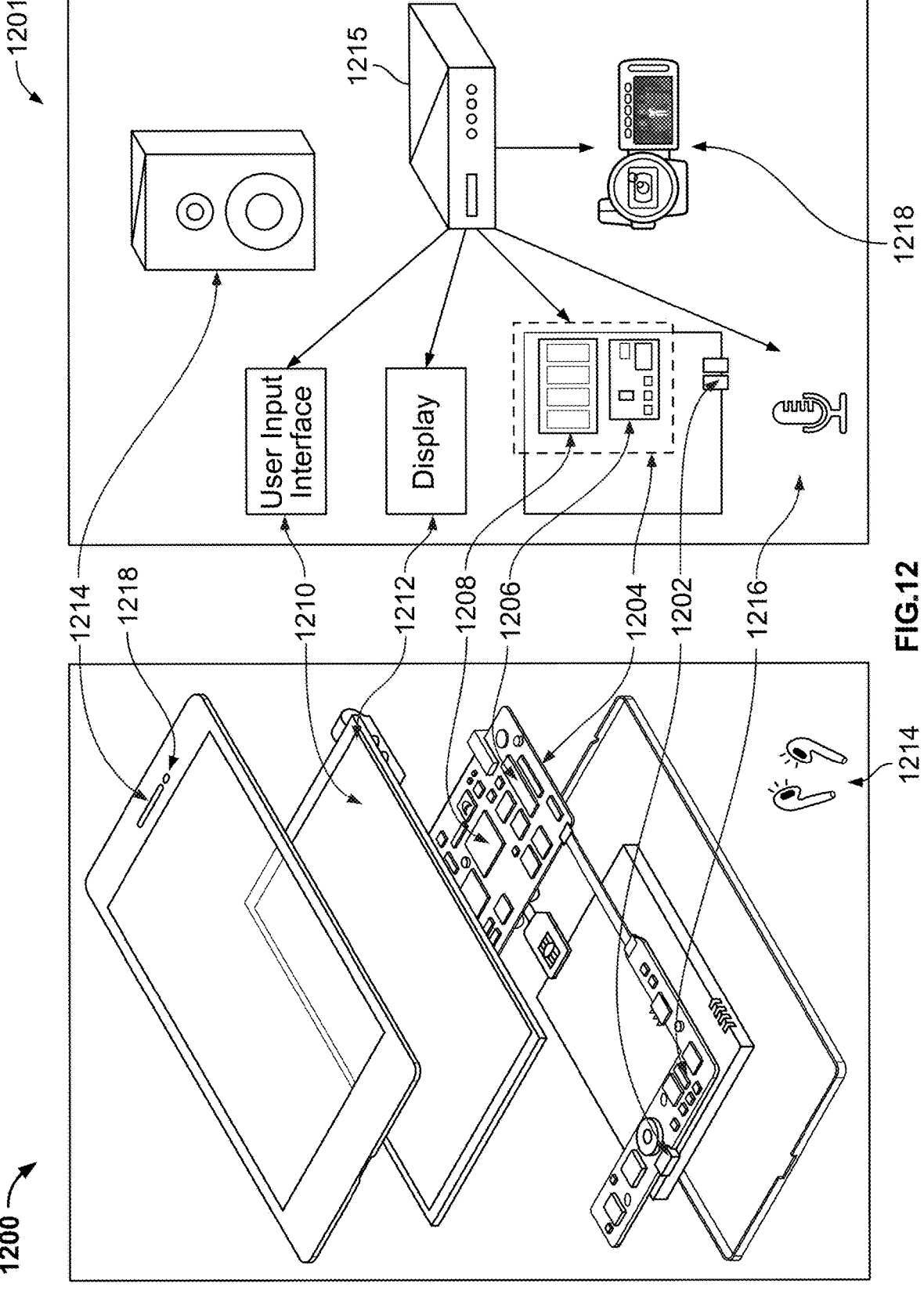
FIG. 12 shows an illustrative user equipment device, in accordance with some embodiments of this disclosure.
Figure 13:
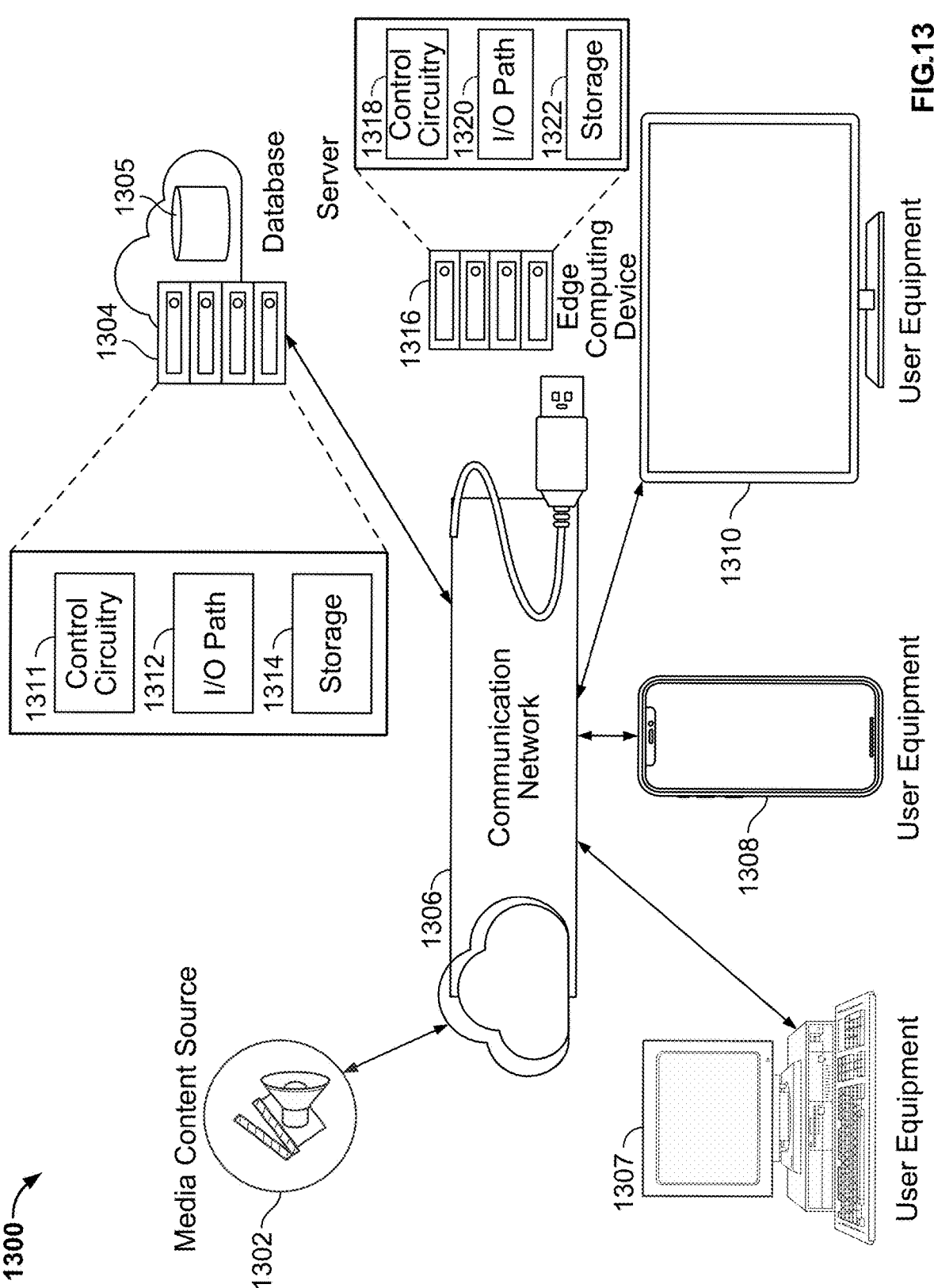
FIG. 13 shows an example system, in accordance with some embodiments of this disclosure.

FIGS. 12-13 depict illustrative devices, systems, servers, and related hardware for image encoding/decoding. FIG. 12 shows generalized embodiments of illustrative user equipment devices 1200 and 1201. For example, user equipment device 1200 may be a smartphone device, a tablet, a virtual reality or augmented reality device, or any other suitable device capable of processing video data. In another example, user equipment device 1201 may be a user television equipment system or device. User television equipment device 1201 may include set-top box 1215. Set-top box 1215 may be communicatively connected to microphone 1216, audio output equipment (e.g., speaker or headphones 1214), and display 1212. In some embodiments, display 1212 may be a television display or a computer display. In some embodiments, set-top box 1215 may be communicatively connected to user input interface 1210. In some embodiments, user input interface 1210 may be a remote-control device. Set-top box 1215 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 1200 and user equipment device 1201 may receive content and data via input/output (I/O) path (e.g., circuitry) 1202. I/O path 1202 may provide content (e.g., broadcast programming, on-demand programming, Internet content, content available over a local area network (LAN) or wide area network (WAN), and/or other content) and data to control circuitry 1204, which may comprise processing circuitry 1206 and storage 1208. Control circuitry 1204 may be used to send and receive commands, requests, and other suitable data using I/O path 1202, which may comprise I/O circuitry. I/O path 1202 may connect control circuitry 1204 (and specifically processing circuitry 1206) to one or more communications paths (described below). I/O functions may be provided by one or more of these communications paths, but are shown as a single path in FIG. 12 to avoid overcomplicating the drawing. While set-top box 1215 is shown in FIG. 12 for illustration, any suitable computing device having processing circuitry, control circuitry, and storage may be used in accordance with the present disclosure. For example, set-top box 1215 may be replaced by, or complemented by, a personal computer (e.g., a notebook, a laptop, a desktop), a smartphone (e.g., device 1200), a tablet, a network-based server hosting a user-accessible client device, a non-user-owned device, any other suitable device, or any combination thereof.

Control circuitry 1204 may be based on any suitable control circuitry such as processing circuitry 1206. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for the codec application stored in memory (e.g., storage 1208). Specifically, control circuitry 1204 may be instructed by the codec application to perform the functions discussed above and below. In some implementations, processing or actions performed by control circuitry 1204 may be based on instructions received from the codec application.

In client/server-based embodiments, control circuitry 1204 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 12, the instructions may be stored in storage 1208, and executed by control circuitry 1204 of a device 1200.

In some embodiments, the codec application may be a client/server application where only the client application resides on device 1200, and a server application resides on an external server (e.g., server 1304 and/or server 1316). For example, the codec application may be implemented partially as a client application on control circuitry 1204 of device 1200 and partially on server 1304 as a server application running on control circuitry 1311. Server 1304 may be a part of a local area network with one or more of devices 1200 or may be part of a cloud computing environment accessed via the internet. In a cloud computing environment, various types of computing services for performing searches on the internet or informational databases, providing encoding/decoding capabilities, providing storage (e.g., for a database) or parsing data are provided by a collection of network-accessible computing and storage resources (e.g., server 1304 and/or edge computing device 1316), referred to as "the cloud." Device 1200 may be a cloud client that relies on the cloud computing capabilities from server 1304 to determine whether processing (e.g., at least a portion of virtual background processing and/or at least a portion of other processing tasks) should be offloaded from the mobile device, and facilitate such offloading. When executed by control circuitry of server 1304 or 1316, the codec application may instruct control circuitry 1311 or 1318 to perform processing tasks for the client device and facilitate the encoding/decoding.

Control circuitry 1204 may include communications circuitry suitable for communicating with a server, edge computing systems and devices, a table or database server, or other networks or servers. The instructions for carrying out the above-mentioned functionality may be stored on a server (which is described in more detail in connection with FIG. 13). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 13). In addition, communications circuitry may include circuitry that enables peer-to-peer communication of user equipment devices, or communication of user equipment devices in locations remote from each other (described in more detail below).

Memory may be an electronic storage device provided as storage 1208 that is part of control circuitry 1204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1208 may be used to store various types of content described herein as well as codec application data described above. Nonvolatile memory may also be used (e.g., to launch a boot-up routine and other instructions). Cloud-based storage, described in relation to FIG. 12, may be used to supplement storage 1208 or instead of storage 1208.

Control circuitry 1204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1204 may also include scaler circuitry for upconverting and downconverting content into the preferred output format of user equipment 1200. Control circuitry 1204 may also include digital-to-analog converter circuitry and analog-to-digital converter circuitry for converting between digital and analog signals. The tuning and encoding circuitry may be used by user equipment device 1200, 1201 to receive and to display, to play, or to record content. The tuning and encoding circuitry may also be used to receive video data for encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from user equipment device

1200, the tuning and encoding circuitry (including multiple tuners) may be associated with storage 1208.

Control circuitry 1204 may receive instruction from a user by way of user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of each one of user equipment device 1200 and user equipment device 1201. For example, display 1212 may be a touch-screen or touch-sensitive display. In such circumstances, user input interface 1210 may be integrated with or combined with display 1212. In some embodiments, user input interface 1210 includes a remote-control device having one or more microphones, buttons, keypads, any other components configured to receive user input or combinations thereof. For example, user input interface 1210 may include a handheld remote-control device having an alphanumeric keypad and option buttons. In a further example, user input interface 1210 may include a handheld remote-control device having a microphone and control circuitry configured to receive and identify voice commands and transmit information to set-top box 1215.

Audio output equipment 1214 may be integrated with or combined with display 1212. Display 1212 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1212. Audio output equipment 1214 may be provided as integrated with other elements of each one of device 1200 and equipment 1201 or may be stand-alone units. An audio component of videos and other content displayed on display 1212 may be played through speakers (or headphones) of audio output equipment 1214. In some embodiments, audio may be distributed to a receiver (not shown), which processes and outputs the audio via speakers of audio output equipment 1214. In some embodiments, for example, control circuitry 1204 is configured to provide audio cues to a user, or other audio feedback to a user, using speakers of audio output equipment 1214. There may be a separate microphone 1216 or audio output equipment 1214 may include a microphone configured to receive audio input such as voice commands or speech. For example, a user may speak letters or words that are received by the microphone and converted to text by control circuitry 1204. In a further example, a user may voice commands that are received by a microphone and recognized by control circuitry 1204. Camera 1218 may be any suitable video camera integrated with the equipment or externally connected. Camera 1218 may be a digital camera comprising a charge-coupled device (CCD) and/or a complementary metal-oxide semiconductor (CMOS) image sensor. Camera 1218 may be an analog camera that converts to digital images via a video card.

The codec application may be implemented using any suitable architecture. For example, it may be a stand-alone application wholly-implemented on each one of user equipment device 1200 and user equipment device 1201. In such an approach, instructions of the application may be stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to provide encoding/decoding functionality and perform any of the actions discussed herein. Based on the processed instructions, control circuitry 1204 may determine what action to perform when input is received from user input interface 1210. For example, movement of a cursor on a display up/down may be indicated by the processed instructions when user input interface 1210 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/server-based application. Data for use by a thick or thin client implemented on each one of user equipment device 1200 and user equipment device 1201 may be retrieved on-demand by issuing requests to a server remote to each one of user equipment device 1200 and user equipment device 1201. For example, the remote server may store the instructions for the application in a storage device. The remote server may process the stored instructions using circuitry (e.g., control circuitry 1204) and generate the displays discussed above and below. The client device may receive the displays generated by the remote server and may display the content of the displays locally on device 1200. This way, the processing of the instructions is performed remotely by the server while the resulting displays (e.g., that may include text, a keyboard, or other visuals) are provided locally on device 1200. Device 1200 may receive inputs from the user via input interface 1210 and transmit those inputs to the remote server for processing and generating the corresponding displays. For example, device 1200 may transmit a communication to the remote server indicating that an up/down button was selected via input interface 1210. The remote server may process instructions in accordance with that input and generate a display of the application corresponding to the input (e.g., a display that moves a cursor up/down). The generated display is then transmitted to device 1200 for presentation to the user.

In some embodiments, the codec application may be downloaded and interpreted or otherwise run by an interpreter or virtual machine (run by control circuitry 1204). In some embodiments, the codec application may be encoded in the ETV Binary Interchange Format (EBIF), received by control circuitry 1204 as part of a suitable feed, and interpreted by a user agent running on control circuitry 1204. For example, the codec application may be an EBIF application. In some embodiments, the codec application may be defined by a series of JAVA-based files that are received and run by a local virtual machine or other suitable middleware executed by control circuitry 1204. In some of such embodiments (e.g., those employing MPEG-2 or other digital media encoding schemes), codec application may be, for example, encoded and transmitted in an MPEG-2 object carousel with the MPEG audio and video packets of a program.

FIG. 13 is a diagram of an illustrative system 1300 for encoding/decoding, in accordance with some embodiments of this disclosure. User equipment devices 1307, 1308, 1310 (e.g., which may correspond to one or more of computing device may be coupled to communication network 1306). Communication network 1306 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1306) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 13 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1306.

System 1300 may comprise media content source 1302, one or more servers 1304, and one or more edge computing devices 1316 (e.g., included as part of an edge computing system). In some embodiments, the codec application may be executed at one or more of control circuitry 1311 of server 1304 (and/or control circuitry of user equipment devices 1307, 1308, 1310 and/or control circuitry 1318 of edge computing device 1316). In some embodiments, a data structure transmitted by transmitter 701 of FIG. 7 may be stored at database 1305 maintained at or otherwise associated with server 1304, and/or at storage 1322 and/or at storage of one or more of user equipment devices 1307, 1308, 1310.

In some embodiments, server 1304 may include control circuitry 1311 and storage 1314 (e.g., RAM, ROM, Hard Disk, Removable Disk, etc.). Storage 1314 may store one or more databases. Server 1304 may also include an input/output path 1312. I/O path 1312 may provide encoding/decoding data, device information, or other data, over a local area network (LAN) or wide area network (WAN), and/or other content and data to control circuitry 1311, which may include processing circuitry, and storage 1314. Control circuitry 1311 may be used to send and receive commands, requests, and other suitable data using I/O path 1312, which may comprise I/O circuitry. I/O path 1312 may connect control circuitry 1311 (and specifically control circuitry) to one or more communications paths.

Control circuitry 1311 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1311 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1311 executes instructions for an emulation system application stored in memory (e.g., the storage 1314). Memory may be an electronic storage device provided as storage 1314 that is part of control circuitry 1311.

Edge computing device 1316 may comprise control circuitry 1318, I/O path 1320 and storage 1322, which may be implemented in a similar manner as control circuitry 1311, I/O path 1312 and storage 1324, respectively of server 1304. Edge computing device 1316 may be configured to be in communication with one or more of user equipment devices 1307, 1308, 1310 and server 1304 over communication network 1306, and may be configured to perform processing tasks (e.g., for encoding/decoding) in connection with ongoing processing of video data. In some embodiments, a plurality of edge computing devices 1316 may be strategically located at various geographic locations, and may be mobile edge computing devices configured to provide processing support for mobile devices at various geographical regions.

FIG. 14 is a flowchart of a detailed illustrative process 1400 for multi-format processing including texture data for the transmitter, in accordance with some embodiments of this disclosure. In various embodiments, the individual steps of process 1400 may be implemented by one or more components of the devices and systems of FIGS. 7-8, 10, and 12-13. Although the present disclosure may describe certain steps of process 1400 (and of other processes described herein) as being implemented by certain components of the devices and systems of FIGS. 7-8, 10, and 12-13, this is for purposes of illustration only, and it should be understood that other components of the devices and systems of FIGS. 7-8, 10, and 12-13 may implement those steps instead.

At step 1402, control circuitry (e.g., control circuitry 1311, control circuitry 1318, or control circuitry of any of devices 1307, 1308, or 1310) reads a texture and a depth image (x1 and d1). For example, control circuitry may read (or access) a texture image and depth map from storage (e.g., storage 1305, or at storage 1322 and/or at storage of one or more of user equipment devices 1307, 1308, 1310). In some embodiments, control circuitry may be coupled to a sensor device and receive a stream of texture and depth data (e.g., texture image and a depth map) from the sensor device.

At step 1404, the control circuitry decomposes the depth map into (chosen number of) n component depth maps (CDMs) using depth blending functions. For example, the control circuitry may generate the component depth maps using pixel-by-pixel processing of the depth map using the depth blending functions.

At step 1406, the control circuitry forms n multiple focal planes (MFPs). For example, the control circuitry may generate n MFPs by pixelwise multiplication of each CDM of the n CDMs with the texture image (x1).

At step 1408, the control circuitry forms n focal planes for component depth maps (CDMFPs) using CDMs. For example, the control circuitry may generate n CDMFPs by pixelwise multiplication of each CDM of the n CDMs with the depth map. Step 1408 may be an optional step.

At step 1410, the control circuitry encodes the texture image $x_1$ with a chosen quality. For example, a choice for coding quality may be based on the average differences (e.g. MSE) of original and coded pixel values.

At step 1412, the control circuitry selects and encodes n−1 other source images with chosen qualities. For example, the control circuitry may increase or reduce the quality at different depth ranges (distances) by using bits on (e.g., selecting and encoding) a CDM at a greater distance so that far away depth properties are emphasized, and using bits on (e.g., selecting and encoding) a closer MFP so that both nearby texture and depth are emphasized for quality.

At step 1414, the control circuitry multiplexes and synchronizes all images and sends the data to the decoder(s). For example, the control circuitry may multiplex and synchronize the encoded texture image and n−1 encoded source images to the decoder(s). In some embodiments, input/output circuitry (e.g., input/output circuitry 1311 of FIG. 13) connected to the control circuitry transmits the data.

FIG. 15 is another flowchart of a detailed illustrative process for multi-format processing including texture data for the receiver, in accordance with some embodiments of this disclosure. In various embodiments, the individual steps of process 1500 may be implemented by one or more components of the devices and systems of FIGS. 7-8, 10, and 12-13. Although the present disclosure may describe certain steps of process 1500 (and of other processes described herein) as being implemented by certain components of the devices and systems of FIGS. 7-8, 10, and 12-13, this is for purposes of illustration only, and it should be understood that other components of the devices and systems of FIGS. 7-8, 10, and 12-13 may implement those steps instead. In some embodiments, process 1500 may be performed to decode data that was encoded and transmitted using process 1400.

At step 1502, input/output circuitry (e.g., input/output circuitry 1311 of FIG. 13) connected to control circuitry (e.g., control circuitry 1311, control circuitry 1318, or control circuitry of any of devices 1307, 1308, or 1310) receives encoded data. For example, input/output control circuitry may receive encoded texture image and n−1 encoded selected source images (e.g., from steps 1410-1414 of FIG. 14).

At step 1504, the control circuitry (e.g., control circuitry 1311, control circuitry 1318, or control circuitry of any of devices 1307, 1308, or 1310) demultiplexes the data. For example, control circuitry may demultiplex the received encoded data (e.g., encoded texture image and n−1 encoded selected source images).

At step 1506, the control circuitry decodes the texture image $x_1'$. For example, the control circuitry may decode encoded texture image to generate decoded texture image $x_1'$.

At step 1508, the control circuitry decodes chosen and received multi-format images. For example, the control circuitry may decode the n−1 encoded selected source images to generate n−1 decoded selected source images.

At step 1510, the control circuitry forms 'missing' multi-format components by the inverse processes for depth blending and using the partition of unity rule. For example, the control circuitry may form source images that were not received in step 1502 (e.g., source images that were not selected and encoded in step 1412 and transmitted in step 1414 of FIG. 14).

At step 1512, the control circuitry sums up source images in unified formats to average out coding errors in the multi-format presentation. In some embodiments, step 1512 is an optional step.

At step 1514, the control circuitry forms an enhanced texture image $x_2'$ and an enhanced depth map $d_2'$. For example, the texture image $x_2'$ and the depth map $d_2'$ may be improved by the received multiformat components. In some embodiments, the set of MFPs may be summed up pixel by pixel to generate an enhanced texture image $x_2'$. In some embodiments, a set of reformed CDMFPs may be summed up to generate an enhanced depth map. In some embodiments, a set of CDMs may be inverse depth blended to generate an enhanced depth map.

At step 1516, the control circuitry uses the result for display or other purposes. In some embodiments, other purposes may refer to further image processing, e.g., computer analysis for detecting and tracking objects at different distances (depth) of the scene. For example, the control circuitry may use the result (e.g., set of MFPs) for accommodation support. For example, the control circuitry may use the result (e.g., enhanced texture image and depth map) for stereoscopic 3D rendering.

FIG. 16 is a flowchart of a detailed illustrative process for using a multi-format representation for coding and transmission for the transmitter, in accordance with some embodiments of this disclosure. In various embodiments, the individual steps of process 1600 may be implemented by one or more components of the devices and systems of FIGS. 7-8, 10, and 12-13. Although the present disclosure may describe certain steps of process 1600 (and of other processes described herein) as being implemented by certain components of the devices and systems of FIGS. 7-8, 10, and 12-13, this is for purposes of illustration only, and it should be understood that other components of the devices and systems of FIGS. 7-8, 10, and 12-13 may implement those steps instead.

At step 1602, control circuitry (e.g., control circuitry 1311, control circuitry 1318, or control circuitry of any of devices 1307, 1308, or 1310) accesses an image data comprising a texture data and a depth map. In some embodiments, control circuitry accesses or reads a texture image and depth map from storage (e.g., storage 1305, or at storage 1322 and/or at storage of one or more of user equipment devices 1307, 1308, 1310). In some embodiments, control circuitry may be coupled to a sensor device and receive a stream of texture and depth data (e.g., texture image and a depth map) from the sensor device.

At step 1604, the control circuitry decomposes the depth map into a plurality of component depth maps (CDMs). In some embodiments, the plurality of CDMs is a set of n CDMs. Each respective CDM of the plurality of CDMs may correspond to a respective depth range of the depth map.

At step 1606, the control circuitry generates multiple focal planes (MFPs) comprising a plurality of focal planes, wherein each respective focal plane is based on the texture data and a respective CDM of the plurality of CDMs. In some embodiments, the plurality of focal planes is a set of n focal planes. Each respective focal plane of the plurality of focal planes may correspond to a respective depth range of a depth map.

At step 1608, the control circuitry selects a data subset including one or more of: (a) the texture data, (b) the depth map, (c) the plurality of CDMs, or (d) the plurality of focal planes. For example, the data subset may comprise the texture data and n–1 selected CDMs. As another example, the data subset may comprise the texture data and n–1 selected MFPs. In one example, the data subset may comprise the texture data and n–1 selected CDMs and MFPs, where each one of the selected CDMs and the selected focal planes may correspond to a different depth range of the depth map. For example, the data subset may comprise the depth map and the plurality of focal planes. As an example, the data subset may comprise the plurality of CDMs and the plurality of focal planes. For example, the data subset may comprise the texture data and n selected CDMs and selected focal planes, where each one of the selected CDMs and the selected focal planes may correspond to a different depth range of the depth map.

At step 1610, the control circuitry generates encoded data based on the selected subset. For example, the data subset may comprise texture data and n–1 selected CDMs and MFPs, and control circuitry may generate encoded texture data and n–1 encoded selected CDMs and MFPs.

At step 1612, input/output circuitry (e.g., input/output circuitry 1311 of FIG. 13) connected to the control circuitry transmits, over a communication network, the encoded data to a client device to cause the client device to: generate for display an image based on the encoded data. In some embodiments, step 1612 is optional, and a system may perform steps 1602-1610 and 1614.

At step 1614, input/output circuitry (e.g., input/output circuitry 1311 of FIG. 13) connected to the control circuitry transmits, over a communication network, the encoded data to an intermediary server to cause the intermediary server to: generate reformed data based on the encoded data, the reformed data containing omitted data not included in the selected data subset; and serve a subset of the reformed data to a thin client. In some embodiments, step 1614 is optional, and a system may perform steps 1602-1612.

Figure 17:
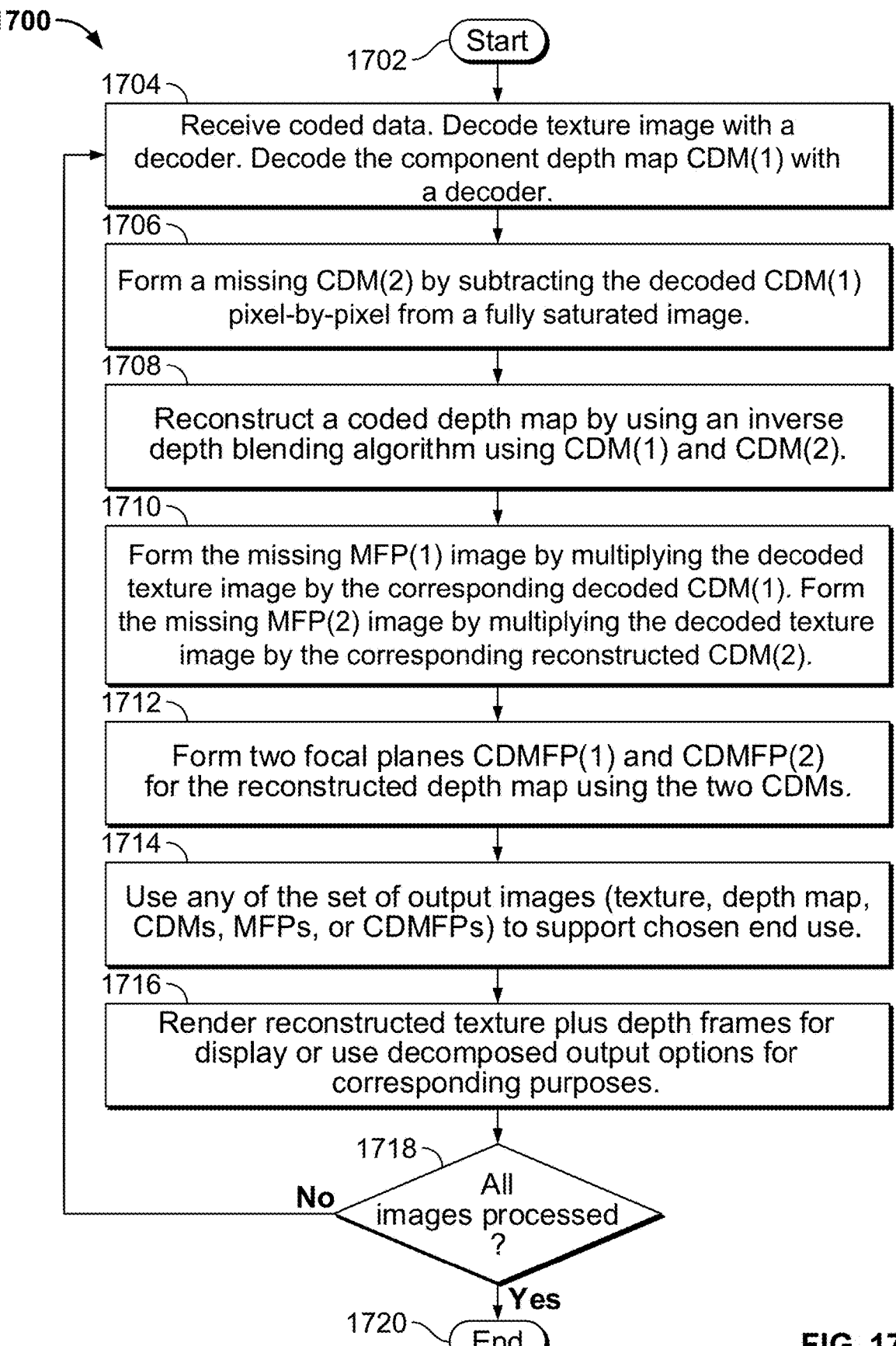
FIG. 17 is an example flowchart of a detailed illustrated process in the receiver, in accordance with some embodiments of this disclosure.

FIG. 17 is a flowchart of a detailed illustrative process in the receiver, in accordance with some embodiments of this disclosure. In various embodiments, the individual steps of process 1700 may be implemented by one or more components of the devices and systems of FIGS. 7-8, 10, and 12-13. Although the present disclosure may describe certain steps of process 1700 (and of other processes described herein) as being implemented by certain components of the devices and systems of FIGS. 7-8, 10, and 12-13, this is for purposes of illustration only, and it should be understood that other components of the devices and systems of FIGS. 7-8, 10, and 12-13 may implement those steps instead.

At step 1702, control circuitry (e.g., control circuitry 1311, control circuitry 1318, or control circuitry of any of devices 1307, 1308, or 1310) starts the process. In some embodiments, steps 1704-1716 may correspond to an example of FIG. 4 option a) and steps taken to decode FIG. 4 option a) in FIG. 9. For example, references to CDM(1), CDM(2), MFP(1), MFP(2), CDMFP(1) and CDMFP(2) of FIG. 17 may correspond to (e.g., is the same as, similar to) CDM1, CDM2, MFP1, MFP2, CDMFP1, and CDMFP2, respectively, of FIGS. 4 and 9.

At step 1704, input/output circuitry (e.g., input/output circuitry 1311 of FIG. 13) connected to the control circuitry receives coded data. The control circuitry decodes texture image with a decoder. The control circuitry decodes the component depth map CDM(1) with a decoder.

At step 1706, the control circuitry forms a missing CDM (2) as partition of unity (partition of a maximum value) complement by subtracting the decoded CDM(1) pixel-by-pixel from a fully saturated image.

At step 1708, the control circuitry reconstructs a coded depth map by using an inverse depth blending algorithm using CDM(1) and CDM(2).

At step 1710, the control circuitry forms the missing MFP(1) image by multiplying (e.g., by pixelwise multiplication) the decoded texture image by the corresponding decoded CDM(1). The control circuitry forms the missing MFP(2) image by multiplying the reconstructed texture image by the corresponding reconstructed CDM(2).

At step 1712, the control circuitry forms two focal planes CDMFP(1) and CDMFP(2) for the reconstructed depth map using the two CDMs.

At step 1714, the control circuitry uses any of the set of output images (texture, depth map, CDMs, MFPs, or CDMFPs) to support chosen end use.

At step 1716, the control circuitry renders reconstructed texture plus depth frames for display or use decomposed output options for corresponding purposes (i.e., MFPs for accommodation support and MFPs and CDMFPs to viewpoint synthesis to texture and depth, correspondingly).

At step 1718, the control circuitry checks whether all images are processed. If all images are not processed, control circuitry proceeds to step 1704. If all images are processed, control circuitry proceeds to step 1720 to end the process.

In some embodiments, if high quality coding is used for the coded CDM, its accuracy is inherited also by a 'complement' CDM derived using the partition of unity property. A complete depth map may thus also be reconstructed with high accuracy. Similarly, the increased accuracy may be inherited by the reconstructed 'missing' MFP. A texture image received as their sum may correspondingly be of higher quality than the directly received texture image. Thus, in some embodiments, a system may reconstruct the texture image for use, even if the texture data has been received as a default component (cf. output signals $x_1'$ and $x_2'$).

FIG. 18 is a flowchart of a detailed illustrative process for using a multi-format representation for decoding video and texture data, in accordance with some embodiments of this disclosure. In various embodiments, the individual steps of process 1800 may be implemented by one or more components of the devices and systems of FIGS. 7-8, 10, and 12-13. Although the present disclosure may describe certain steps of process 1800 (and of other processes described herein) as being implemented by certain components of the devices and systems of FIGS. 7-8, 10, and 12-13, this is for purposes of illustration only, and it should be understood that other components of the devices and systems of FIGS. 7-8, 10, and 12-13 may implement those steps instead.

At step 1802, control circuitry (e.g., control circuitry 1311, control circuitry 1318, or control circuitry of any of devices 1307, 1308, or 1310) decodes the encoded data to generate (a) decoded texture data and (b) n−1 decoded selected CDMs and decoded selected focal planes, wherein the plurality of CDMs is a set of n CDMs, the plurality of focal planes is a set of n focal planes and each respective focal plane of the plurality of focal planes corresponds to a respective depth range of the depth map.

At step 1804, the control circuitry generates n reformed CDMs and n reformed focal planes from the decoded texture data and the n−1 decoded selected CDMs and decoded selected focal planes, wherein the n reformed CDMs and n reformed focal planes contain omitted CDMs and omitted focal planes that were not included in the selected data subset. In some embodiments, the system generates a reformed depth map by inverse depth blending the n reformed CDMs.

In some embodiments, the system generates a reformed CDM of the n reformed CDMs by summing n−1 CDMs of the n reformed CDMs to generate a partial CDM sum; and subtracting the partial CDM sum from a saturated matrix to generate the reformed CDM. A saturated matrix may be a fully saturated image.

In some embodiments, the system generates a reformed focal plane of the n reformed focal planes by: summing n−1 reformed focal planes of the n reformed focal planes to generate a partial MFP sum; and subtracting the partial MFP sum from the decoded texture data to generate the reformed focal plane.

In some embodiments, the system generates, from a decoded CDM of the n reformed CDMs, a corresponding reformed focal plane of the n reformed focal planes by: multiplying the decoded texture data by the decoded CDM to generate the corresponding reformed focal plane of the n reformed focal planes.

The disclosed multi-format approach may improve and extend a video plus depth format further by using distance (depth blending) based decompositions to produce additional content components. These new components, intermediate on a texture—depth continuum, may improve setting, producing, and perceiving desired depth-dependent content properties.

Further, the disclosed approach may provide improved flexibility for the output formats, which—in addition to the traditional video plus depth format—may now include various options based on depth-dependent decompositions. These outputs may support directly e.g. eye accommodation and synthesizing of 3D viewpoints. Using decompositions, the approach may further enable improved overall dynamics and quality, although each component may be coded with less bits and dynamics.

In some embodiments, depth and/or video coding may be used for coding source images. In some embodiments, a bit budget may be used to emphasize chosen signal properties. In some embodiments, using decompositions may enable higher dynamics and accuracy in coding.

In some embodiments, the number of source images to be coded may not necessarily increase redundancy. In some embodiments, depth blending may split (sample) the image information into multiple depth ranges, i.e., into different component images with little/no redundancy. This property may bring the benefit of adjusting bit budget between depth ranges as desired, in application or case-specific way—e.g., on those distances of interest in a surveillance view (cf. respecting the privacy of other targets). Choosing between depth and texture components for coding may mean setting weight on specific content properties (e.g., higher quality for distant objects/features, or e.g., more quality when coding close, textured regions). In some embodiments, coding more component images may enable increasing the overall quality (dynamics) over coding fewer components.

In some embodiments, an output format may be selected/changed based on application/user need (to be reconstructed). A reconstructed format (e.g., selected output format) may be changed on-the-fly (e.g., for supporting accommodation by MFPs, should a client device support it). In some embodiments, a network server (e.g., on the edge) may service multiple clients with individual contents and needs by parsing several outputs from one multi-format content. In some embodiments, a server may include support for client/case dependent quality control (e.g., emphasizing quality of certain distances or textures). The operations for depth blending and its inverse may be simple per pixel operations.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

accessing image data that comprises texture data and a depth map;

decomposing the depth map into a plurality of component depth maps (CDMs);

generating, from the texture data and the CDMs, a plurality of multiple focal plane (MFP) data structures, wherein each MFP data structure is produced by pixel-wise combining the texture data with a respective CDM;

generating, from the depth map and the CDMs, a plurality of CDM-weighted depth plane (CDMFP) data structures;

selecting, based on a selection criterion, a data subset from among: (a) the texture data, (b) the depth map, (c) the plurality of CDMs, (d) the plurality of MFP data structures, or (e) the plurality of CDMFP data structures;

generating encoded data based on the selected data subset to produce encoded data; and transmitting, over a communication network, the encoded data to a client device to cause the client device to generate for display an image based on the encoded data.

2. The method of claim 1, wherein:

the plurality of CDMs is a set of n CDMs; and the data subset comprises (a) the texture data and (b) n−1 selected CDMs.

3. The method of claim 1, wherein:

the plurality of MFP data structures is a set of n focal planes; and the data subset comprises (a) the texture data and (b) n−1 selected focal planes.

4. The method of claim 1, wherein the data subset comprises (a) the depth map and (b) the plurality of MFP data structures.

5. The method of claim 1, wherein the data subset comprises (a) the plurality of CDMs and (b) the plurality of MFP data structures.

6. The method of claim 1, wherein:

the plurality of CDMs is a set of n CDMs;

the plurality of focal planes is a set of n focal planes, wherein each respective CDM of the plurality of CDMs and each respective focal plane of the plurality of MFP data structures corresponds to a respective depth range of the depth map; and the data subset comprises (a) the texture data, (b) selected CDMs, and (c) selected focal planes, wherein a total number of (b) the selected CDMs and (c) the selected focal planes is n−1, and wherein each one of the selected CDMs and the selected focal planes corresponds to a different depth range of the depth map.

7. The method of claim 6, wherein the transmitting the encoded data to the client device causes the client device to generate for display the image by:

decoding the encoded data to generate (a) decoded texture data (b) decoded selected CDMs and (c) decoded selected focal planes, wherein a total number of (b) the decoded selected CDMs and (c) the decoded selected focal planes is n−1; and generating, based at least in part on the decoded texture data, the decoded selected CDMs, and the decoded selected focal planes, n reformed CDMs and n reformed focal planes, wherein the n reformed CDMs and the n reformed focal planes contain omitted CDMs and omitted focal planes that were not included in the selected data subset.

8. The method of claim 7, wherein the generating the n reformed CDMs and the n reformed focal planes comprises:

generating a reformed CDM of the n reformed CDMs by:

summing n−1 reformed CDMs of the n reformed CDMs to generate a partial CDM sum; and subtracting the partial CDM sum from a saturated matrix to generate the reformed CDM.

9. The method of claim 7, wherein the generating the n reformed CDMs and the n reformed focal planes comprises:

generating a reformed focal plane of the n reformed focal planes by:

summing n−1 reformed focal planes of the n reformed focal planes to generate a partial MFP sum; and subtracting the partial MFP sum from the decoded texture data to generate the reformed focal plane.

10. The method of claim 7, wherein the generating the n reformed CDMs and the n reformed focal planes comprises:

generating, from a decoded CDM of the n reformed CDMs, a corresponding reformed focal plane of the n reformed focal planes by:

multiplying the decoded texture data by the decoded CDM to generate the corresponding reformed focal plane of the n reformed focal planes.

11. The method of claim 7, wherein the transmitting the encoded data to the client device causes the client device to generate for display the image by further:

generating a reformed depth map by inverse depth blending the n reformed CDMs.

12. The method of claim 1, wherein:

the plurality of CDMs is a set of n CDMs;

the plurality of focal planes is a set of n focal planes, wherein each respective CDM of the plurality of CDMs and each respective focal plane of the plurality of focal planes corresponds to a respective depth range of the depth map; and the data subset comprises (a) the texture data, (b) selected CDMs, and (c) selected focal planes, wherein a total number of (b) the selected CDMs and (c) the selected focal planes is n, and wherein each one of the selected CDMs and the selected focal planes corresponds to a different depth range of the depth map.

13. A system comprising:

control circuitry configured to:

access image data that comprises texture data and a depth map;

decompose the depth map into a plurality of component depth maps (CDMs);

generate, from the texture data and the CDMs, a plurality of multiple focal planes (MFP) data structures, wherein each MFP data structure is produced by pixel-wise combining the texture data with a respective CDM;

generate, from the depth map and the CDMs, a plurality of CDM-weighted depth plane (CDMFP) data structures;

select, based on a selection criterion, a data subset from among: (a) the texture data, (b) the depth map, (c) the plurality of CDMs, (d) the plurality of MFP data structures, or (e) the plurality of CDMFP data structures; and generate encoded data based on the selected data subset to produce encoded data; and input/output circuitry configured to:

transmit, over a communication network, the encoded data to a client device to cause the client device to generate for display an image based on the encoded data.

14. The system of claim 13, wherein:

the plurality of CDMs is a set of n CDMs;

the plurality of focal planes is a set of n focal planes, wherein each respective CDM of the plurality of CDMs and each respective focal plane of the plurality of focal planes corresponds to a respective depth range of the depth map; and the data subset comprises (a) the texture data, (b) selected CDMs, and (c) selected focal planes, wherein a total number of (b) the selected CDMs and (c) the selected focal planes is n−1, and wherein each one of the selected CDMs and the selected focal planes corresponds to a different depth range of the depth map.

15. The system of claim 14, wherein the control circuitry configured to transmit the encoded data to the client device causes the client device to generate for display the image by:

decoding the encoded data to generate (a) decoded texture data (b) decoded selected CDMs and (c) decoded selected focal planes, wherein a total number of (b) the decoded selected CDMs and (c) the decoded selected focal planes is n−1; and generating, based at least in part on the decoded texture data, the decoded selected CDMs, and the decoded selected focal planes, n reformed CDMs and n reformed focal planes, wherein the n reformed CDMs and the n reformed focal planes contain omitted CDMs and omitted focal planes that were not included in the selected data subset.

16. The system of claim 15, wherein the generating the n reformed CDMs and the n reformed focal planes comprises:

generating a reformed CDM of the n reformed CDMs by:

summing n−1 reformed CDMs of the n reformed CDMs to generate a partial CDM sum; and subtracting the partial CDM sum from a saturated matrix to generate the reformed CDM.

17. The system of claim 15, wherein the generating the n reformed CDMs and the n reformed focal planes comprises:

generating a reformed focal plane of the n reformed focal planes by:

summing n−1 reformed focal planes of the n reformed focal planes to generate a partial MFP sum; and subtracting the partial MFP sum from the decoded texture data to generate the reformed focal plane.

18. The system of claim 15, wherein the generating the n reformed CDMs and the n reformed focal planes comprises:

generating, from a decoded CDM of the n reformed CDMs, a corresponding reformed focal plane of the n reformed focal planes by:

multiplying the decoded texture data by the decoded CDM to generate the corresponding reformed focal plane of the n reformed focal planes.

19. The system of claim 15, wherein the control circuitry configured to transmit the encoded data to the client device causes the client device to generate for display the image by further:

generating a reformed depth map by inverse depth blending the n reformed CDMs.

20. The system of claim 13, wherein:

the plurality of CDMs is a set of n CDMs;

the plurality of focal planes is a set of n focal planes, wherein each respective CDM of the plurality of CDMs and each respective focal plane of the plurality of focal planes corresponds to a respective depth range of the depth map; and the data subset comprises (a) the texture data, (b) selected CDMs, and (c) selected focal planes, wherein a total number of (b) the selected CDMs and (c) the selected focal planes is n, and wherein each one of the selected CDMs and the selected focal planes corresponds to a different depth range of the depth map.

* * * * *